United States Patent
Mansfield, Jr. et al.

(10) Patent No.: US 6,822,555 B2
(45) Date of Patent: Nov. 23, 2004

(54) FIRE SYSTEM IMPLEMENTED WITH POWER LINE COMMUNICATIONS

(75) Inventors: Amos R. Mansfield, Jr., Provo, UT (US); Douglas H. Marman, Ridgefield, WA (US)

(73) Assignee: General Electric Company, Schenactady, NY (US)

( * ) Notice: Subject to any disclaimer, the term of this patent is extended or adjusted under 35 U.S.C. 154(b) by 0 days.

(21) Appl. No.: 10/229,379

(22) Filed: Aug. 27, 2002

(65) Prior Publication Data

US 2003/0052770 A1 Mar. 20, 2003

Related U.S. Application Data

(62) Division of application No. 09/713,675, filed on Nov. 15, 2000, now Pat. No. 6,441,723.
(60) Provisional application No. 60/165,553, filed on Nov. 15, 1999.

(51) Int. Cl.[7] .............................................. H04M 11/04
(52) U.S. Cl. ........................... 340/310.01; 340/310.02; 340/310.03; 340/310.04; 340/310.05; 340/310.06; 340/538
(58) Field of Search ....................... 340/310.01, 310.02, 340/310.03, 310.04, 310.05, 310.06, 538, 310.07, 310.08

(56) References Cited

U.S. PATENT DOCUMENTS

| | | | |
|---|---|---|---|
| 4,057,793 A | 11/1977 | Johnson et al. | 340/310 |
| 4,429,299 A | 1/1984 | Kabat et al. | 340/310 R |
| 4,668,934 A | 5/1987 | Shuey | 340/310 |
| 4,675,668 A | 6/1987 | Ise et al. | 340/825.08 |
| 4,755,792 A | 7/1988 | Pezzolo et al. | 340/538 |
| 4,804,938 A | 2/1989 | Rouse et al. | 340/310 |
| 4,907,222 A | 3/1990 | Slavik | 370/85.7 |
| 5,101,191 A | 3/1992 | MacFadyeh et al. | 340/310 R |
| 5,185,591 A | 2/1993 | Shuey | 340/310 A |
| 5,491,463 A | 2/1996 | Sargeant et al. | 340/310.01 |
| 5,680,445 A | 10/1997 | Bogner et al. | 379/106 |
| 5,717,685 A * | 2/1998 | Abraham | 340/310.01 |
| 5,905,442 A | 5/1999 | Mosebrook et al. | 340/825.06 |

* cited by examiner

Primary Examiner—Daniel J. Wu
Assistant Examiner—Daniel Previl
(74) Attorney, Agent, or Firm—Stoel Rives LLP

(57) ABSTRACT

An electric power line communication system operates with an electric power distribution system to provide through premises power distribution lines highly reliable communication links among receiving devices electrically coupled or located in proximity to the premises power distribution lines. A power line transceiver is designed to transmit and receive through the premises power distribution lines modulated carrier signals conveying information over the communication links. The power line transceiver operates in a transmitter mode as an intentional radiator to emit modulated carrier signals by transmitting them at a frequency band and a power level sufficient to form by electrical conduction a communication link with a modulated carrier signal receiving device.

49 Claims, 10 Drawing Sheets

DIALOG PLC INSTALLATION DIAGRAM

FIRE SYSTEM IMPLEMENTED WITH POWER LINE COMMUNICATIONS

RELATED APPLICATIONS

This application is a division of U.S. patent application No. 09/713,675, filed Nov. 15, 2000, now U.S. Pat. No. 6,441,723. which claims benefit of U.S. Provisional Patent Application No. 60/165,553, filed Nov. 15, 1999.

TECHNICAL FIELD

The present invention relates to a power line communications system and, in particular, to such a system that provides through premises power distribution lines highly reliable communication links among signal receiving devices electrically coupled or located in proximity to the premises power distribution lines.

BACKGROUND OF THE INVENTION

Two main companies that have established many years of success with low cost consumer power line communications equipment are X-10 and Phonex. The X-10 products are the current industry standard for low bandwidth communications over power lines for control applications.

The X-10 technology is incorporated into a wide range of products that meet the low bandwidth requirements, but the X-10 products are far from reliable. In fact, the reliability is sufficiently unreliable that the X-10 technology should not be implemented in life safety devices like smoke detectors and is usually relegated to lighting control applications. The Phonex technology is incorporated into telephone extension and modem extension devices that have higher bandwidth than is needed for control and alarm communication. However, even higher reliability is needed when security or fire alarm messages need to be communicated. What is needed, therefore, is a highly reliable, low bandwidth power line communication technology for the communication of control, alarm, and short messaging data through the power distribution lines in homes and offices.

SUMMARY OF THE INVENTION

The present invention is a highly reliable power line communication system that is implemented with a novel power line transceiver. The invention can be incorporated in alarm and control systems, messaging systems, and home server music systems. The addition of an RF bridge and two-way RF communications to power line communications enables use of the power lines as an antenna.

The present invention exhibits the following properties that overcome problems with the existing products that are used for low bandwidth control and alarm reporting applications: much better signal to noise ratios for much higher reliability; signals can couple across line-cuts in emergency alarm conditions; signals couple across phase wiring, so that no phase bridges are required; a significantly higher number of device addresses and message types are available; communication continues even after complete loss of AC power; full two-way communication protocol incorporates error checking; and acknowledgments of all alarm and control messages for high reliability.

These improvements provided by the present invention are accomplished through the six innovations summarized below.

The first innovation entails transmission of signals using the frequency bands between 2–40 MHz, and does not rely on AC zero crossings to communicate. Use of the higher frequency band (2–40 MHz) allows for faster communication baud rates than those used by X-10 products and for significantly more device addresses and message types. Not relying on AC zero crossings, along with the use of battery back-up in life safety and security equipment, allows the equipment to continue communicating even after complete loss of AC power.

The second innovation is the achievement of regulatory approval under Federal Communications Commission (FCC) Part 15 as an "intentional radiator." Power line communication devices have never been listed this way before. However, in the case of life safety equipment, such as smoke detectors or security alarm equipment, it is important to be able to ensure communication even if the power distribution lines become severed or are intentionally cut. Listing a device as an intentional radiator allows for higher transmission power of 10–1000 times more than devices listed as unintentional radiators. This higher power, along with the higher frequencies, also enables signals to easily couple across phases and across severed or broken lines.

The third innovation entails the use of any of the following bands under FCC regulations: 13.553–13.567 MHz, 26.96–27.28 MHz, and 40.66–40.70 MHz for low bandwidth communications requiring extremely high reliability such as for life safety and security alarm and control applications; and 1.705–10 MHz for high bandwidth communications, in which the bandwidth is 10 percent or more of the center frequency, requiring good reliability. These are the only bands in the 2–40 MHz area that the FCC allows for higher power emissions because of the listing as an intentional radiator. (The terms low and high bandwidth are, of course, relative terms. The bandwidth of a band is limited by the difference between the low and high frequencies of the band. The 13.553–13.567 MHz band is, therefore, limited to a bandwidth of 14 kHz, or about 1 percent of the carrier frequencies.)

The fourth innovation entails coupling of communications between the two power distribution lines instead of between one power line and ground. Power line communications devices apparently have not been sold in this configuration before. This reduces a number of problems inherent with grounds and meets the criteria for FCC limits on conducted emissions for intentional radiators.

The fifth innovation entails the addition of an RF signal bridge and two-way RF signal communication to transmit signals from the power distribution lines, using them as an antenna.

The sixth innovation entails the use of an RF signal bridge to implement two-way communication between battery operated devices.

Additional objects and advantages of this invention will be apparent from the following detailed description of preferred embodiments thereof which proceeds with reference to the accompanying drawings.

DETAILED DESCRIPTION OF PREFERRED EMBODIMENTS

Transceiver Circuitry

Figure 1A:
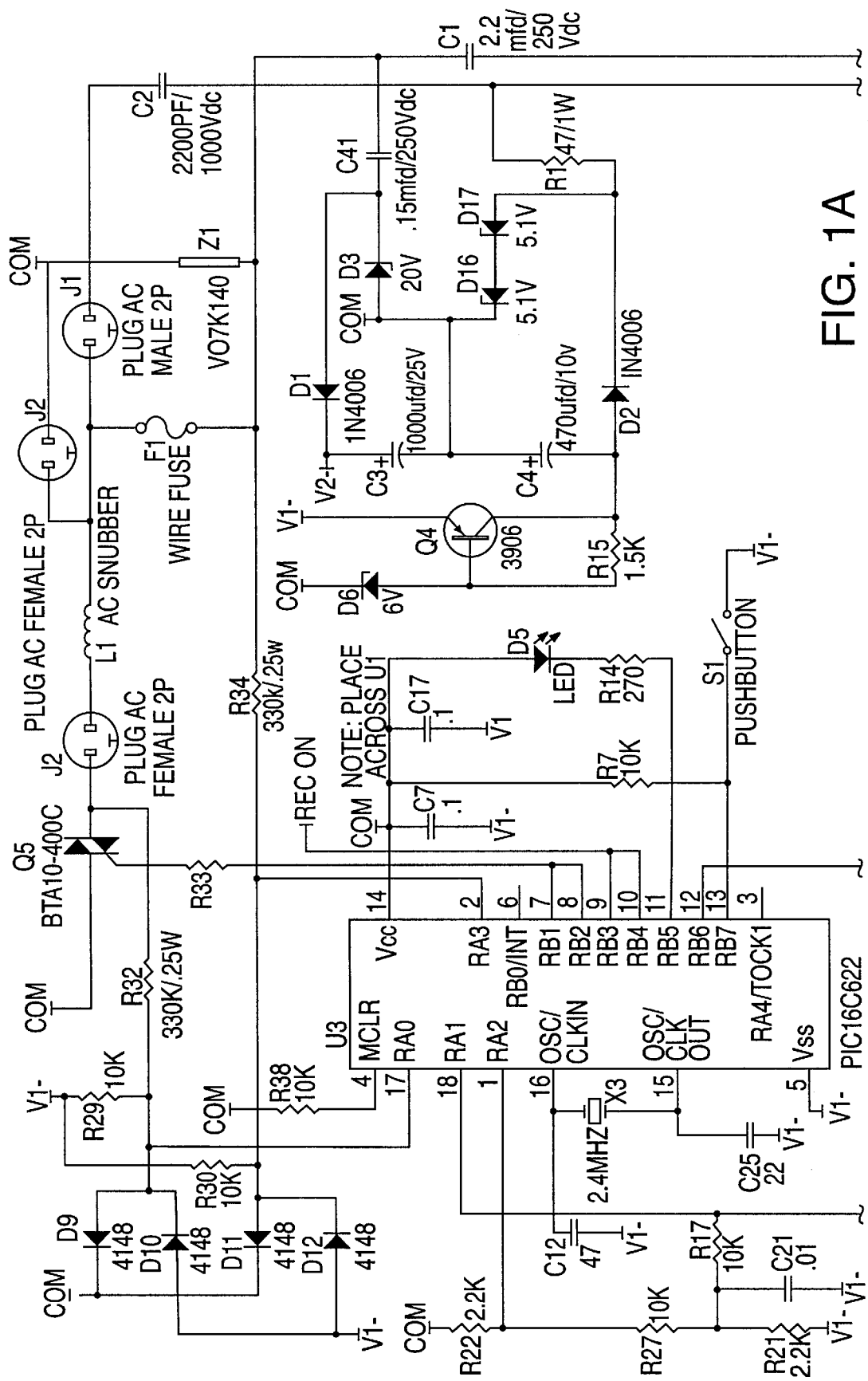
FIGS. 1A and 1B (collectively, "FIG. 1") together form an electrical circuit schematic diagram of a preferred embodiment of a low data bandwidth power line transceiver designed in accordance with the invention.
Figure 1B:
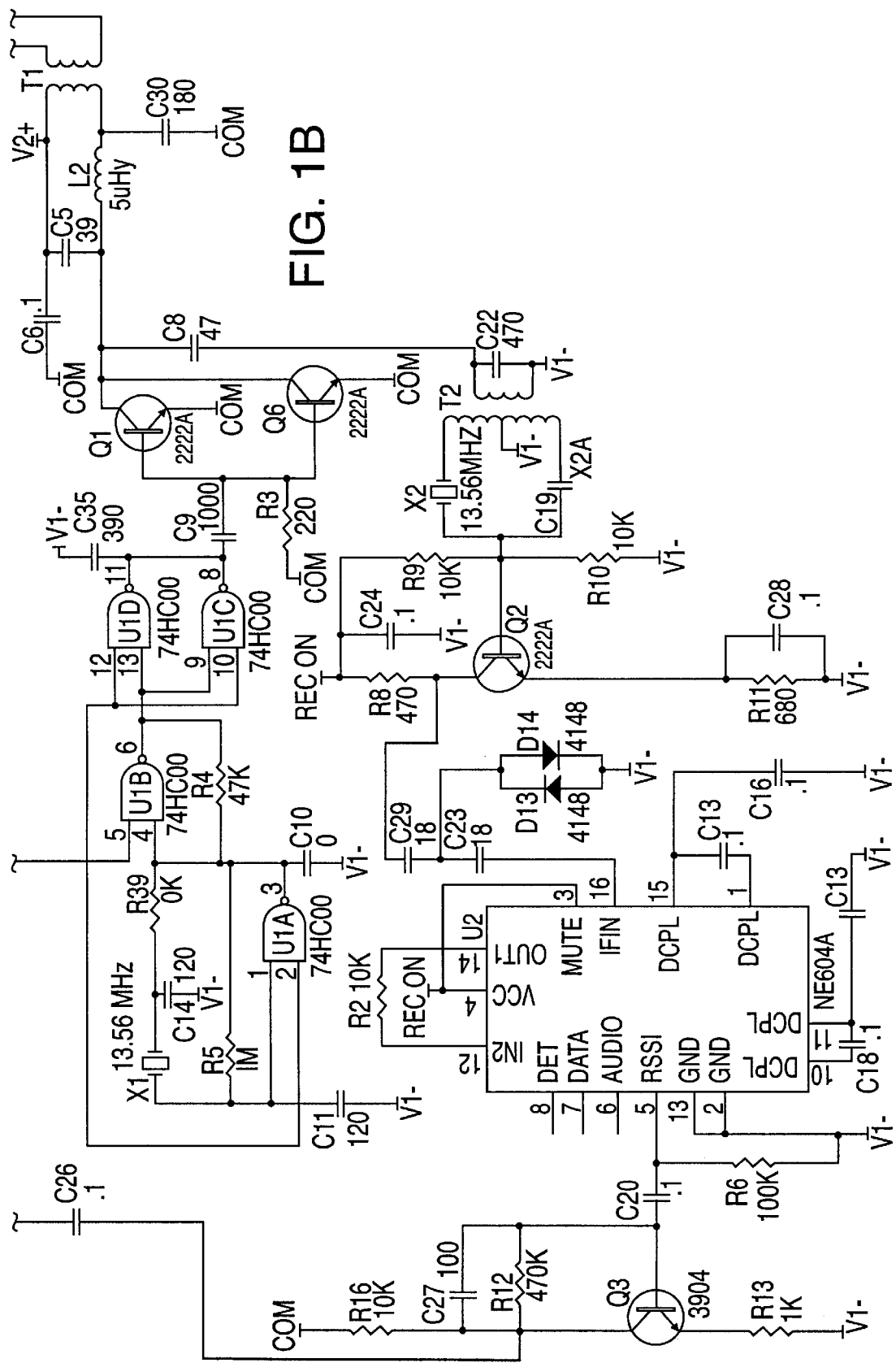

FIG. 1 is an electrical circuit schematic diagram of a preferred embodiment for a low data bandwidth power line transceiver, which incorporates a number of features designed to keep costs low while enabling highly reliable communications. For example, the transceiver uses one frequency control crystal, tuned to 13.56 MHz, that generates the AM modulated transmission signals. The following is a full description of the circuit operation implemented in a lamp module, which is called a Dialog LC-Lamp Module.

The Dialog LC-Lamp Module contains six basic circuits combined to provide the following functions: logic and receiver power supply, transmitter power supply, receiver, microprocessor, lamp power control, and transmitter.

Logic and Receiver Power Supply

The logic and receiver power supply delivers 5 volt power to the logic, control, receiver and transmitter oscillator-buffer circuits. The 120 volt AC source is reduced to a 10 volt square wave through a combination of a series nonpolarized capacitor, C1, and zener diodes, D16 and D17. The pulsating AC is passed through diode D2 and is filtered by C4, with the resulting negative DC voltage applied to series regulator formed by Q4, R15, and D6. The output of this regulator is the negative side supply labeled as V1−. The microprocessor, transmitter logic, and receiver circuits are connected between COM (the positive end of the 5 volts provided by the series regulator) and V1−.

Transmitter Power Supply

The transmitter power supply provides positive 20 volts to the transmitter output stage. The 120 volt AC source is reduced to a 20 volt square wave through a combination of a series-connected nonpolarized capacitor, C41, and zener diode, D3. The pulsating AC is passed through diode D1 and is filtered by C3, with the resulting positive DC voltage applied to the collectors of Q1 and Q6 through the radio frequency output circuit formed by T1, L2, and associated capacitors. The transmitter output transistors operate in Class C, which means that they do not draw current unless there is drive current flow into their bases from the transmitter oscillator-buffer integrated circuit, U1. Normal transmitter operation is short bursts of energy lasting approximately 0.025 second. These short bursts draw down the voltage across C3 to less than 10 percent. Thus, only a low charging current into C3 is provided through the series capacitor, C41, and diode, D1. This reduces the size requirement for C41 and the quiescent power dissipation of the circuit.

Receiver

The receiver is comprised of an input frequency selective band-pass filter, a transistor gain stage, Q2, followed by a shunt diode limiter formed by D13 and D14, an integrated circuit limiter/amplifier, U2, and a transistor amplifier, Q3. The input band-pass filter limits the possibility of interference from out-of-band signals and reduces the amount of ambient noise passed on through the receiver. The RF amplifier stage adds gain to the overall receiver. The receiver configuration is a TRF (Tuned Radio Frequency) circuit. This provides maximum simplicity and minimum parts count for a receiver with this overall capability. The integrated circuit limiter-amplifier is a device designed for FM receiver use with 90 dB of amplitude limited gain. One of the outputs of the limiter-amplifier is an RSSI (Received Signal Strength Indicator) signal. This signal is normally used to provide signal strength indication to the receiver user and to provide input to the stereo/mono selection circuit of an FM broadcast receiver. In this case, the RSSI signal is being used as an envelope detector because it provides a faithful reproduction of the CW (Continuous Wave) signals used for communicating data by the system. The limiter diodes, D13 and D14, are required to increase the dynamic range handling capability of the receiver. Without the limiter diodes, severe pulse distortion occurs, particularly with high level input signals.

Microprocessor

A microprocessor, U3, receives the reconstructed data output pulses from the receiver and converts their data representations into functional commands for the module. Besides communication handshaking and protocol processing, microprocessor U3 responds to received commands to control a Triac, Q5, which delivers AC power to lamps plugged into socket J2. Microprocessor U3 monitors the AC voltage delivered to the module as well as the AC voltage across Triac Q5. The input AC voltage is reduced by high value series resistors and limited to logic levels by diodes, D9 to D12. The resulting signals provide the processor with zero-crossing times for the incoming AC voltage wave. The microprocessor times the turn-on of Triac Q5 from the zero crossing so Triac Q5 can thus control the brightness of the external lamp.

Lamp Power Control

The lamp power control is accomplished by control of the conduction angle of the Triac Q5. When Triac Q5 is turned on for the full conduction cycle of the AC wave, the external lamp is turned on at full brightness. Shorter conduction times reduce the brightness of the lamp accordingly. Values stored in the microprocessor controller establish discrete conduction angles so Triac Q5 can be turned on at fixed levels. Thus, commands can be issued to set the on-time of Triac Q5 to specific levels of brightness. The sharp conduction angles possible with rapid turn-on of Triac Q5 is dampened by inductor L1, which is in series with the AC voltage supplied to the external lamp.

Transmitter

The transmitter is composed of a crystal controlled oscillator including a crystal X1 tuned to 3.56 MHz, logic gate U1A, and associated discrete components; transmitter buffer formed by logic gates U1B, U1C, and U1D; and a transmitter output stage composed of Q1 and Q6. Oscillations at the transmitter output frequency are generated by the transmitter oscillator circuit, buffered by the additional logic gates U1B, U1C, and U1D, and capacitively coupled to the bases of Q1 and Q6. Information in the form of data is provided by microprocessor U3, which turns on the operation of all the logic gates U1A–U1D with a logic level high signal. When microprocessor U3 sends a logic level low signal to the logic gates U1A–U1D, all oscillations are stopped and no signal is delivered to Q1 and Q6, turning them off completely. No complex transmit/receive switching is required with this system because the transmitter does not load the input of the receiver during receive operation and the receiver represents a very light load to the transmitted output signal. The transmitter output is nominally 1 watt, which is significant for a device communicating over power distribution lines but sufficiently low so as to not adversely affect the receiver or its input circuit.

Innovative Applications Implemented with the Transceiver

The above-described power line communication transceiver design enables the creation of new, low cost products that provide improved performance over existing technologies. They fall into four different product categories: low data bandwidth alarm and control products, fire systems using power line communications, messaging products using power line communications, and home server music systems with power line distribution. These are each described separately below.

Low Data Bandwidth Alarm and Control Products

Low data bandwidth alarm and control products can be implemented with the same basic transceiver design shown in FIG. 1 and described above with particular reference to a lamp module referred to as the Dialog LC-Lamp Module. They use the specified low bandwidth frequency bands (13.553–13.567 MHz, 26.96–27.28 MHz, and 40.66–40.70 MHz) and a common overall protocol. They are, therefore, capable of interacting and working concurrently in a system, even though their functions can vary significantly. This group of products includes four basic product types: lighting and electrical control devices, smoke detectors or hazardous gas sensors, alarm reporting and security sensors, and electrical equipment monitoring. The lighting and electrical control devices include lamp modules that can turn on and off lamps, or dim them if desired; appliance modules that can turn on and off electrical appliances; light bulb socket modules that can turn on and off, or dim, lights; and control devices that are used to activate and control the lighting and electrical appliances.

Figure 2:
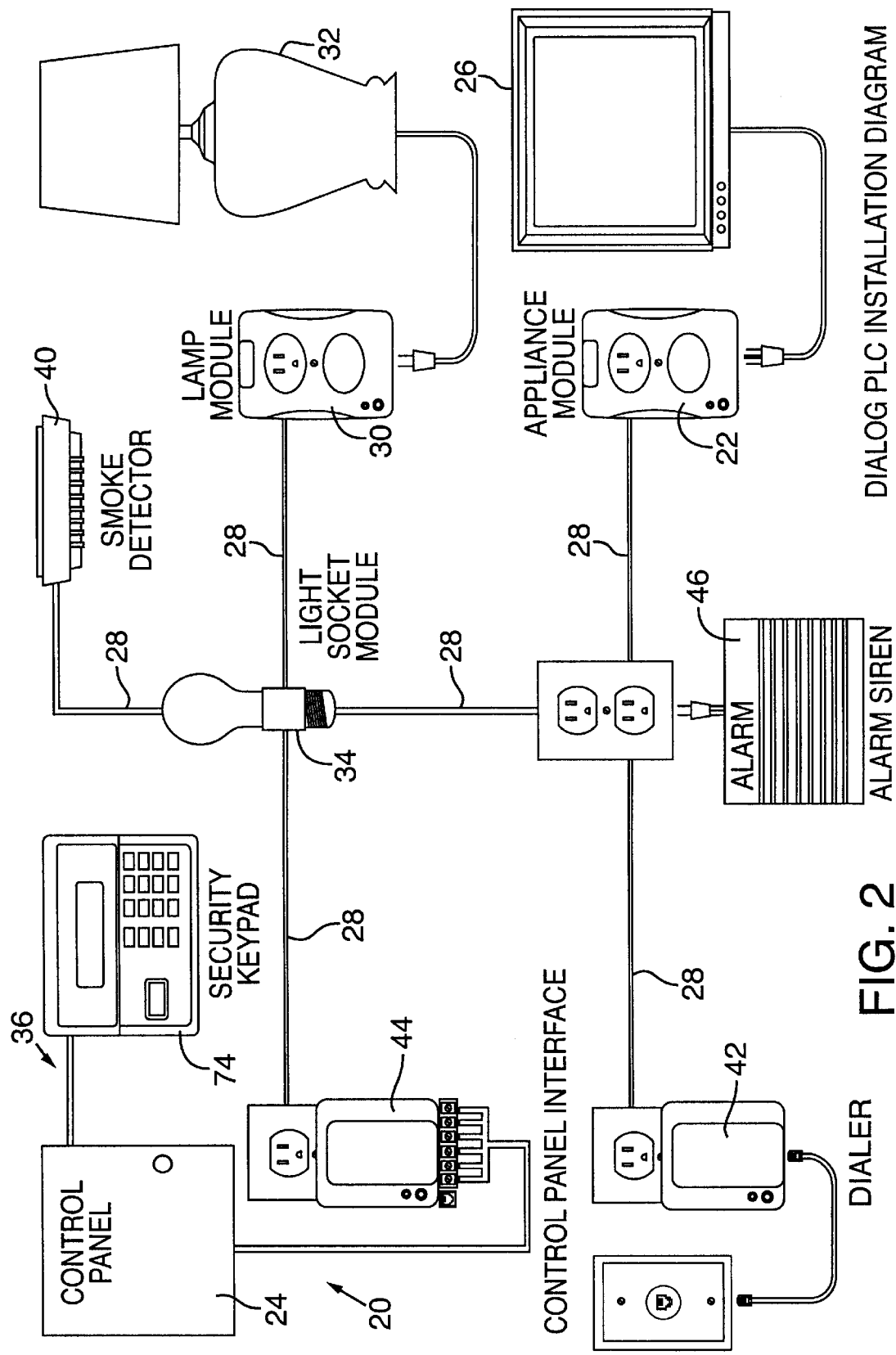
FIG. 2 is a pictorial diagram showing different types of low data bandwidth alarm and control products implemented with the transceiver of FIG. 1 and interconnected by communication links over premises power distribution lines.

FIG. 2 is a pictorial diagram showing the four basic product types interconnected with power line communication (PLC). The main improvements in these products stem from the innovations discussed with reference to FIG. 1 in connection with the transceiver design and include increased reliability for control and supervision of these products.

With reference to FIG. 2, a power line communication system 20 enables an appliance module 22 to sense and communicate to a system domain controller 24 the removal or disconnection of an appliance 26 from power distribution lines 28. This can be accomplished by an impedance sensing circuit built into the appliance module 22, which sensing circuit enables appliance module 22 to report an alarm or alert when an appliance 26 has been removed. A lamp module 30, which represents the Dialog LC-Lamp Modules, can control the brightness of a lightbulb in a lamp 32.

A light bulb socket module 34 includes an input connector that allows external connection of a combination motion/daylight sensor. This added sensor enables socket module 34 to turn on and off lights when motion is sensed, when dawn or dusk arrives, or in combination when motion is sensed only after dusk and before dawn, such as in outdoor applications. Socket module 34 also sends out a motion or daylight sensor alert message onto the power distribution lines 28 for communication to other devices, such as other light switches or an alarm system 36.

Appliance module 22 or other such equipment control module can optionally include an infrared transceiver for communication to TVs, VCRs, stereophonic or other remote controlled equipment. Alarm system 36 can automatically activate such equipment to mimic "at home" activity when alarm system 36 has been armed in the "away" mode, or can silence an audio or sound system in the case of a fire alarm, for example. They can also be used to receive signals from a hand-held remote control device to turn on and off lights or electrical appliances.

The equipment modules do not need thumb wheel or dip switches for address selection because they can include either pre-assigned addresses or addresses automatically assigned by system domain controller 24 when the modules are enrolled into the system. One technique for enrolling modules into the system is described in International Application No. PCT/US 99/23386, filed Oct. 6, 1999, and published as International Publication No. WO 00/21053, Apr. 13, 2000.

The full two-way communication links between the appliance and lighting control modules 22, 30, and 34 permits the use of a simple LED display to indicate the status of those lights and appliances. Thus, when turning on or off a light in, for example, the backyard or a detached garage, a person can easily see that the light has turned on or off by the LED located over the switch. If motion detectors are connected to some of the lamp modules 30, for example, this display would show when those lights turned on or off.

A smoke detector 40 and a hazardous gas sensor (not shown) are life safety products that need to operate in a reliable communication system. As indicated in the background of the invention, current X-10 products cannot reliably work with life safety products because of poor reliability cessation of communication operation upon a loss of AC power. The transceivers of the present invention do not depend upon the AC zero crossings and use a much higher frequency to permit communication when AC non-zero voltage is present, or with battery back-up during complete loss of AC voltage.

A smoke detector that includes a heat detector can send heat information to thermostat control devices, providing heat information throughout the building, as well as sending an alarm report to a monitoring station in, for example, system domain controller 24, when temperatures fall to freezing or below.

Alarm reporting and security sensors include dialers 42 and modems with power line communication capabilities, as well as interface modules 44, to allow output messages from alarm control panel 24 to control the power line devices 22, 28, and 30 and to allow for sensors to send input messages to alarm control panel 24. Also included are sirens 46 and other annunciators, such as voice annunciators, that can indicate alarm conditions by signaling through power lines 28, and security sensors, such as motion sensors, that can communicate alarm messages by way of power lines 28 to alarm control panel 24.

There are three additional innovations included in this product type and result from the feature that, in case of telephone line loss or line cut problems, dialer or modem modules are capable of communicating to neighboring dwellings that have similar systems. The first innovation relates to communications to devices powered off the same electric transformer. Since the transceivers operating as intentional radiators are capable of transmitting much more power, they can communicate reliably to other devices powered off the same AC transformer. Typically 26 dwellings can be powered by one electric transformer. If the telephone line at protected premises is cut and there is an urgent system alarm, the modem sends out a high power distress signal over the power distribution lines. If a neighboring system with an operating telephone line responds, the alarm information will be relayed to the neighboring system so that it can dial out the urgent alarm signals. This enables neighboring systems to increase the security levels of their systems with little extra cost.

The present invention operates differently from the system of U.S. Pat. No. 4,731,810 ('810 patent), which describes a Neighborhood Home Security System that reports alarm messages by way of the AC wiring to neighboring homes. The system of the '810 patent does not use circuitry implemented with any of the advances inherent in the transceiver design of the present invention. The system of the '810 patent requires a security control dialer to include telephone line cut inputs to tell it to send the alarm messages to neighboring systems. It does not attempt to communicate to the neighboring systems before then. The system of the present invention is, however, always communicating messages using the AC power lines that connect to all of the neighboring systems.

The present system can also request neighboring systems to dial out simply because the premise telephone line is busy or in use, and does not require the telephone line to be cut or become operational. The present system can, for example, send a message by way of an available neighboring telephone line rather than disconnect the premises telephones that are in use. If no neighboring telephones are available, then the premise telephones will be disconnected to seize the line for dial out. If the call cannot be completed, irrespective of whether the telephone lines have been cut, the system can then repeat requests for neighboring systems to dial out. In the case of genuine emergencies, even a neighboring system could be requested to disconnect its premises telephone to seize the line for dial out. The practice of all of these functions would, of course, require the prior approval and support of all the neighboring system owners.

The second innovation relates to installations in apartments or dormitory-type dwellings. In these cases, a modem or dialer need not be included in each living area. One modem or dialer can receive or send signals to or from any of the living units and thereby result in significant cost savings in installation and equipment. It also enables facility managers to have access to valuable status information, such as the proper operation of smoke detectors, or burglar alarm messages.

The third innovation relates to a system interface between the AC transceivers and a typical security control panel. These panels, especially when a smoke detector or other fire sensor is used, enable the use of supervised sirens or alarm annunciators. This is to ensure that the wires connecting the control panel to the siren are operational when the time for an alarm arrives. The panel supervises this link and automatically annunciates any trouble with the connection. Since the present system uses a full two-way communication protocol, together with full supervision of all devices on the system, the control panel interface module offers for the first time a siren capable of AC wiring communication with full supervision. The module is wired to the control panel in the same way as a siren is connected. However, the module instead connects to the AC wiring and communicates to a remote siren. The siren also includes a battery in case of AC power loss. The siren can annunciate the same signal sent out from the control panel to the interface module, and the interface module indicates a loss of supervision by simulating a cut in the connection to the control panel, in the same manner as the panel usually detects a loss of connection.

The last product type in this group is electrical equipment monitoring. This includes products that can monitor meters, such as utility meters, or electrical appliances such as dishwashers, washing machines, ovens, refrigerators, and similar product types. An inexpensive, yet reliable, way of providing information to or from these electrical appliances enables a significant improvement in product service at lower costs. An inexpensive way of reporting electrical meters on an hourly basis, for example, allows a public utility to offer variable rate pricing or load shedding, where devices can be turned on or off automatically to maximize their energy efficiency and thereby reduce electrical power costs. Those same appliances, using the same transceivers, not only can be controlled for maximum energy efficiency, but also can report diagnostic or test information to service companies. This allows a technician to determine the cause of a problem without visiting the premise, can be used to warn of impending failure, or can provide other useful technical information. The main advantages in these areas arise from the highly reliable, low cost method of communicating over power lines. Moreover, in the case of meter reading, the ability to reliably communicate throughout the neighborhood enables one dialer or modem connection to monitor all homes.

Fire System Using Power Line Communications

Many existing homes and apartments have installed in them smoke detectors powered from the premises power distribution lines. Only relatively new systems have an extra wire installed to enable any smoke detector to set off all the other smoke detectors in the system. This is generally called "tandem" communication and is considered sufficiently important by the Fire Alarm and Fire Response community that it has become a requirement in the U.S. National Fire Code for all new residential construction. Smoke detectors are also required to include battery back up, in case of power failure. However, for all homes or residential living areas wired before these requirements were established, it is extremely difficult and expensive to rewire a dwelling to add the extra wire currently required for tandem communications. Smoke detectors installed in existing home fire systems are also not monitored or supervised for proper operation.

With respect to power line communications, for the reliability reasons stated above, the X-10 technology has never been incorporated into smoke detectors or fire alarm products. There are also other new line carrier communications technologies implemented with spread spectrum techniques for more reliable communications. One version of line carrier communications is listed as a standard option for CEBus products, but there is apparently no smoke detector with line carrier communication technologies built in.

This invention can be used in many levels of performance, depending on the needs of the application. In its simplest form, this invention makes the use of smoke detectors, preferably of high quality, such as the photoelectric type, with a power line communications device built in. This communications device incorporates a transceiver of the type described with reference to FIG. 1 to achieve the benefits required. These transceivers are capable of being identified through an electronic address of some kind. In a preferred embodiment, this means of addressing is accomplished by pre-programming a very large digital address into the smoke detector when it is shipped from the factory. It is, however, possible to use dip switches for setting an address on the smoke detector or for the detectors to receive their addresses from a master control unit.

A preferred procedure for substituting smoke detectors incorporating the present invention for older smoke detectors is as follows. During installation, new smoke detectors are substituted for the old smoke detectors one at a time. The first detector installed, which is called the Master Detector, establishes a house code, which is a digital address identifying that dwelling. This is accomplished by pushing and holding down a "Test" button on the smoke detector for a time, e.g., ten seconds, after it is first installed. To confirm that it has established itself as the house code master for the system, this smoke detector emits one long beep sound. A house code is used to prevent detectors in a neighbor's dwelling using the same technology from setting off alarms in both dwellings. The design of the process and method of addressing and enrolling detectors prevents this from occurring.

When the installer is ready to install the next smoke detector, he first returns to the Master Detector and pushes the "Test" button for about 5 seconds. At this time the Master Detector begins to beep, indicating that it is in an "Enroll Mode." Then the installer can install the rest of the detectors, which are called Slave Detectors. The Enroll Mode period continues for a time, preferably 20 minutes, after the last detector has been enrolled; thereafter the enrollment period ends.

Figure 3:
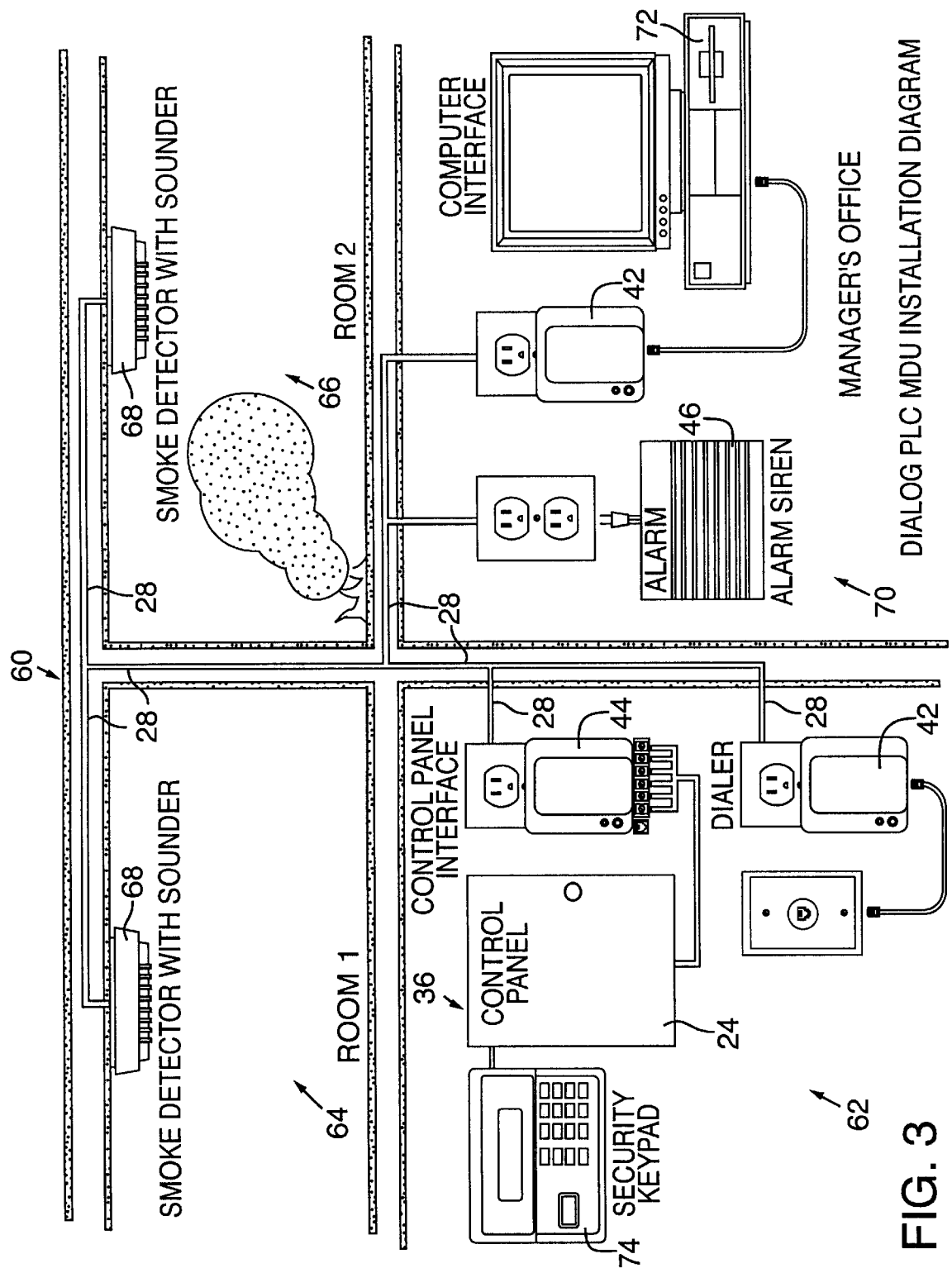
FIG. 3 is a pictorial diagram showing multiple smoke detectors distributed throughout a dwelling and in data communication by power line communication links using premises power distribution lines.

Every detector, upon installation and power-up, automatically sends out a message over the premises power distribution lines to which it is attached. If it is the Master Detector, there will be no response to this message. If it is a follow-on or Slave Detector and the Master Detector has been placed in enroll mode, the Master Detector will automatically answer the message and tell the Slave Detector the house code being used. The Slave Detector for its subsequent communications messages then uses this house code. Once this initial enrollment communication takes place, and the new Slave Detector has received the proper house code, the new Slave Detector emits three rapid beeps, to indicate enrollment has been completed satisfactorily. FIG. 3 is a pictorial diagram showing the interconnection of multiple smoke detectors with power line communication links connecting them.

With reference to FIG. 3, an exemplary dwelling 60 includes four separate areas distributed throughout the dwelling and linked with premises power distribution lines 28. A first area 62 contains an alarm system 36 with a system domain controller 24, together with telephone line dialer 42 and control panel interface 44 with power line communication capabilities, as described with reference to FIG. 2. Premises power distribution lines 28 provide communication links between second and third areas 64 and 66, shown as rooms each with smoke detector with sounder devices 68 installed in them. A fourth area 70 represents a multiple dwelling unit (MDU) manager's office in which are located a computer interface 72 is connected to a telephone line dialer 42 with power line communication capabilities and an alarm siren 46 with power line capabilities.

The above-described procedure illustrates that the invention facilitates the replacement of older premises power distribution line-powered smoke detectors with no wiring changes. The new detectors are also preferably equipped with connectors that enable the new smoke detectors to easily connect to the most popular wiring connectors of the old technology.

These new smoke detectors provide several operational benefits. During an alarm, the smoke detector that has detected the fire condition will send over the premises power distribution lines an alarm message identified by a specific digital message, along with the proper house code and an identification address for that particular detector. In a preferred embodiment, the Master Detector, or a separate control unit as discussed later, stores the individual identification address of each detector, so that it can return an acknowledgment to that individual detector and send that alarm message out to all the other detectors. The Master Detector will also wait to receive a confirmation message from each of the other detectors to verify that every detector has received the message correctly. If any detector has not properly acknowledged receipt of its alarm message, then the Master Detector will again try communicating with that individual detector until the Master Detector gets the proper response. Skilled persons will appreciate that, if desired, every smoke detector can store the individual addresses of all the detectors in the system, provided that the number of detectors is not too large. Each detector can make sure the message has been communicated properly, therefore, without requiring only the Master Detector to perform this function. In this simplest form of the invention, this might be most desirable approach; however, in more advanced forms, a master or control unit may be best suited for this function.

In this way, all of the smoke detectors in the dwelling are notified of the alarm condition, and a general alarm is annunciated throughout the living area. The alarm indicating detection of a fire in a basement can, therefore, still be heard throughout the home, giving the residents added lifesaving minutes to escape before the fire has reached their bedrooms. This describes the simplest form for this new invention.

Another beneficial improvement can be attained by adding to the system devices that can turn on and off lights by control messages sent over the premises power distribution lines. These controllable light switch devices can either be installed in standard light bulb sockets, e.g., light socket module 34, or replace standard light switches, e.g., lamp module 30. They do not include battery back up, like the smoke detectors, but otherwise communicate in the same way as the transceivers in the smoke detectors. When an alarm message is sent by a smoke detector with a proper house code, the controllable light switch device recognizes the alarm message as a signal to turn on the light, and does so immediately. The activation of interior lighting allows an occupant waking to a fire alarm in the middle of the night to avoid fatal delays resulting from searching for light switches or stumbling while trying to exit in the dark.

The controllable light switch devices are enrolled in the same manner as smoke detectors 68 described above, but another improvement is also available, if desired. Instead of returning to the Master Detector or control unit to enter the Enroll Mode, an installer can approach an individual detector and hold its Test button for 5 seconds to enter a special Enroll Mode that will enroll only controllable light switch devices. In this way, light switches can be enrolled to respond only to a particular smoke detector, if desired. This allows particular lights to turn on only when that smoke detector is the one that first detects the fire condition. The benefits of this are to provide an indication of the best path to exit the dwelling. The path where the lights are lit become the indication of safe passage. A light path can be extremely helpful to children, who can become confused by the alarms, and gives an indication of which detector has detected the fire.

This invention facilitates addition of a smoke detector in a detached living area or workshop. When an alarm occurs, the detectors in the home are all set off as well, but when the occupant sees that the house lights have not turned on, he or she can immediately look to see whether the workshop or other living area lights are on. In this way, anyone can easily determine the location of the fire, thereby enabling a safer exit and response to the fire condition.

The use of system domain controller 24 improves the functionality of a dwelling fire system of this invention. Controller 24 can be plugged into any power socket, as long as it cannot be switched off, and operates with battery back up, in case of power loss. In its first form, controller 24 can simply provide display and supervision of the dwelling fire system. For example, it will periodically poll all the detectors, such as once an hour, to verify that all detectors are communicating properly. The detectors can also report when their back-up batteries need replacing, the smoke detectors need cleaning, or they have failed for some reason. The control unit also contains a Test switch for testing the system, or for resetting an alarm when it has been activated by a false condition.

System domain controller 24 can also enable a function known as Alarm Verification, which is carried out as follows. When a first alarm message is received, a Reset message is sent back to all the smoke detectors so that they do not yet annunciate the alarm. If a second alarm message is received from any smoke detector within a period of 1–2 minutes, the alarm message is sent out to all smoke detectors sounding an alarm. Alarm Verification is well known within hardwired commercial fire systems to prevent unwanted false alarms, without causing a harmful delay should real alarms occur. If the fire system is monitored remotely, such a false alarm could trigger by the local Fire Department a response that would not only be unnecessary but would also increase the chances of an accident in response to that alarm, or delays in responding to other genuine alarms.

The Test button on any detector will cause all the other detectors to signal an alarm for a preset period of time. The message sent is different from an alarm message so that, if the system is monitored, Test messages will not be confused with Alarm messages. If the system is in alarm for any reason, any Test button, on the smoke detectors or the control unit, can also be used to silence the whole system. The smoke detector that first detected the fire condition will continue to beep for a period of time to help identify which detector it was and what the problem might be. If the detector detects the fire condition again, it will send a new alarm message and again turn on all of the alarms.

System domain controller 24 using a telephone dialer 42 or a modem can communicate alarm messages, as well as trouble signals about low batteries or dirty smoke detectors, to a remote monitoring station. This ensures that the home is being monitored even when no one is at home, or if only children or pets are at home but do not know how to respond, and the Fire Department can be summoned immediately.

The dwelling depicted in FIG. 3 demonstrates the utility of the invention in apartments, dormitories, hotels, and motels. In these facilities, one system domain controller 24 can easily monitor all of the smoke detectors in that building, and in some cases multiple buildings when powered by the same power line transformer. The transformer will generally stop communications over the power lines. However, it is apparent that with the above invention the premises power distribution line-powered smoke detectors could easily be replaced in a motel, hotel, or apartment complex. Such facilities would not only benefit from the supervision of those smoke detectors to verify that the back-up batteries are operational and the detector sensitivity is correct, but also would facilitate alarm monitoring by staff at the hotel or by a remote monitoring center.

A final example of improvements in the system entails including a speaker in each smoke detector, with prerecorded voice messages built into the control unit. Since it is possible to send telephone quality voice signals through the power lines, it is also possible to send these voice messages out to all of the smoke detectors. This can allow the vocal announcement of "Fire" during emergencies. If the smoke detectors are equipped with a means of setting on which floor they are installed, such as the first floor or second floor, or means are provided for programming these details into the system domain controller, then during an alarm condition, the system domain controller unit could send voice messages to the smoke detectors, such as "Fire on floor One" or "Fire in the workshop." This system equipped as described could enable significantly improved responses, especially for children in a residential area. In the case of hotels and motels, these messages could also include evacuation information that is either a prerecorded or a "live" announcement from the Fire Department to the rooms affected.

The above-described invention is implemented with a reliable power line communications technology that does not have problems transmitting across the multiphase wiring in most dwellings or the larger buildings discussed above. The technology embodies reliable two-way communication, not only for the purpose of sending alarm messages out to all of the smoke detectors, but also for verifying that all messages have been received, and for supervision of the devices in the system. The invention includes the ability to identify a large number of different addresses so that these devices will not be confused with devices in neighboring homes. Moreover, the implementation of the fire system using power line communications in cooperation with an RF signal bridge, which is described below, permits operation by using the power lines as a signal radiator.

It is apparent that other devices could be added to the above system, such as carbon monoxide or other hazardous gas detectors. Auxiliary sirens might be useful, if it is necessary to annunciate alarms where no smoke detector is located. It should also be apparent how this technology could readily be incorporated into the invention described below as a combined security control panel with message center.

Messaging Products Using Power Line Communications

These products are operational with either the lower bandwidth frequency bands discussed above (13.553–13.567 MHz, 26.96–27.28 MHz, or 40.66–40.70 MHz bands) or the higher bandwidth band (1.705–10 MHz). A brief description of the prior art precedes the description of the messaging products of the present invention.

There are currently a number of problems and limitations that exist with security systems in both home and business applications. For example, in the past when a Security Central Monitoring Station (SCMS) wanted to send a message to a security control panel (SCP), the SCMS would need to ring the premises telephone. It is often desirable to send messages or make program changes to the SCP, and this is preferably done at night when the SCMS lines are least busy, telephone costs are lower, and the premises telephone is most likely unused. As can easily be seen with respect to residential locations, however, ringing the home telephone in the middle of the night is not acceptable. Because of this problem, the SCMS in many cases will limit the reason for calling the SCP to absolute necessity or program the SCP to call the SCMS on a regular basis just in case the SCMS may have a message for it to download. This procedure obviously creates a number of unwanted calls to the SCMS and severely limits the message service the SCMS can promptly send to the SCP.

There are also problems created by the fact that many home and small business telephones have answering machines attached. If the SCP waits too many rings before answering the call, then the telephone answering machine will answer first. If the SCP does not wait long enough, it may answer the call before someone at the premises has a chance to answer it. This problem has been resolved in the past by requiring the SCMS to make a call to the premises telephone, disconnect, and then call again in an attempt to fool and bypass the telephone answering machine. Obviously this is a time consuming and arduous solution.

Another problem that exists is that, in many business applications, the facility manager wants a record of when the system was first disarmed in the morning and armed at the end of the day. These are commonly called open and closing reports. Since these calls are made daily by the SCP to the SCMS, a large number of calls are made, thereby significantly increasing costs, as well as tying up the SCMS telephone lines that might be needed for serious incoming alarm messages.

The present invention overcomes these as well as many other problems, and generally provides a significant improvement in the art. This invention combines a number of functions into one system and incorporates new improvements through the synergistic combination of these functions. The following functions can each be built into the SCP, either individually, or in any combination with each other: Caller ID, Caller ID Waiting, Answering Machine functions, E-Mail sending and receiving, and Speakerphone functions. The material presented below initially describes these novel functions in the absence of power line communications.

There are benefits stemming from incorporating Caller ID functions into a SCP, since the Caller ID information can be useful in identifying unwanted calls, which itself is a security feature. This combination system provides, however, a number of new advantages to incorporating Caller ID information into the SCP. First, the SCP includes a list of telephone numbers that it recognizes as SCMS numbers. When the premise telephone is called by one of these numbers, the Caller ID recognizes them and the SCP immediately answers the call, avoiding the obnoxious rings and bypassing any answering machines that might be present. This solves what has been a major limitation in the SCP in the past and enables the SCMS to start providing a new range of services, such as sending messages to the premises beyond those messages limited to security alone. A few examples of such services include notification of school closure during snow days, electric power outage information, weather forecasts, and Dow Jones reports. It is easy to see that simply by the improvement of this invention a whole new range of services can easily be created.

When E-Mail functions are added to the SCP, a new range of benefits is achieved. This E-Mail function allows someone at the premises to send or receive e-mail messages through the typical Internet Service Provider's systems. When incorporated into the SCP, however, this invention provides a number of novel improvements. First, the SCP can send e-mail messages via the Internet for certain alarm conditions. In the past, for example, it has often been desired that the facility manager of his business be notified of the time when the facility is first opened in the morning and closed at night. These reports are often desired in e-mail form, rather than the traditional pager messages sent, since an immediate message alert is not needed. The SCP commonly includes the ability to send pager messages for this purpose, to notify a homeowner when his or her child arrives at home from school, or to send other such messages. Open and closing reports are also commonly sent via the SCMS. However, these reports result in significant cost in added telephone calls (often long distance) as well as tying up critical telephone lines needed for alarm messages. The difficulty of requiring the SCMS to take these messages and converting them to e-mail messages has been also been burdensome, resulting in provision by very few SCMS of these services.

This present invention allows the SCP to send these e-mail messages directly, by way of a local Internet Service Provider (ISP) telephone line and thereby removes the burden from the SCMS. This also makes sending text messages quite easy, while in the past these messages have been special digital protocols designed for reporting alarm conditions. Moreover, when combined with the Caller ID functions described above, this invention now allows the kind of messaging services to be provided by e-mail. In other words, the SCP now has the ability to recognize incoming message calls that incorporate e-mail messages, can answer them immediately without obnoxious ringing of the premise telephone, and can receive those e-mail messages immediately. Or, for messages of lower importance, the SCP can call the local ISP telephone number on a regular basis during the day and download any e-mail messages that may be waiting.

Since it has the ability to send e-mail messages, the SCP can also send text messages to pagers when needed because most pager services allow pager messages to be sent by e-mail. This is a better way of sending pager messages than dialing up the pager service directly because the call is now local and the SCP does not need to know the special protocols used by pager services.

The present invention can also optionally incorporate Answering Machine functions. A number of new functions now become available with the system. First, the display for the SCP can now become a complete message center, displaying when any voice mail or e-mail messages have been received. This is extremely convenient since the SCP display is generally located by the premise entry/exit door for easy disarming and arming of the system. Upon first arrival at the premise, or just before leaving, anyone can now easily see any messages that might be waiting.

The Caller ID functions can now be combined with the Answering Machine functions as well. A list of telephone numbers can be stored in the SCP that identifies the facility manager's telephone or the dwelling owner's telephones. This allows the facility manager or dwelling owner to call his or her premises telephone and immediately be answered by the SCP. The SCP then asks for a security code, and after the security code has been entered, the SCP will report the number and types of messages that are waiting. These messages can be alarm messages or the security system status, as well as voice mail messages and e-mail messages.

Any voice mail messages can immediately be listened to through the typical answering machine remote message pick-up methods. The SCP can also annunciate over the telephone the Caller ID phone numbers for each of the voice mail messages left. If e-mail functions are also combined in the same system, and any e-mail messages are waiting, the number of waiting e-mail messages can also be reported. It is apparent that when both answering machine and e-mail functions are incorporated into the SCP, the notice of a received voice mail message can also be sent by e-mail, along with the corresponding telephone number identified through Caller ID.

Through the combination of these functions, it is now easy for the dwelling owner or facility manager to call while on the way to home or work over a cell phone to retrieve voice mail messages, to check on the security system status, and to determine how many and the urgency of e-mail messages that may be waiting. This information can also retrieved by e-mail from home or work. If the dwelling owner has Three-Way calling services enabled, or if the business has an extra telephone line, the SCP can also automatically dial the Caller ID telephone number to return calls from incoming voice mail messages. This can be useful for two reasons. First, it can make it much more convenient for redialing, especially if the person is on a car cell phone when getting messages. Second, if the return call is long distance, it will probably be less expensive calling through a home or business telephone than from the cell phone.

When Answering Machine functions have been combined the SCP can, with little added cost, call up a telephone number and leave a voice message during specific alarm conditions. For example, if an elderly person has in his or her home such an SCP that also includes a wireless medical panic device, and a previously recorded message has been left on the answering machine identifying a medical emergency, if that panic device has been tripped, then the SCP can immediately notify either the home of that person's caregivers or other local medical response services. One can envision many applications for voice messages to be sent upon alarm conditions.

If Speakerphone functions are also incorporated into the SCP or its display device, then SCP models so equipped can allow a person to listen to any voice mail message and respond to it or any e-mail messages. However, this combination also allows a number of innovative improvements. For example, during alarm conditions, the SCP can also vocally annunciate the alarm using the voice capabilities of the Speakerphone and the prerecorded voice messages of the answering machine. The annunciation of the type of alarm can be very important, since how one responds to a fire condition or medical emergency is quite different from how one responds to a burglary alarm.

With Speakerphone functions available, another useful feature that can be accomplished is two-way voice communications with the SCMS. This is desirable for a number of reasons. First, the SCMS can use the two-way voice communications to listen in at the premises after an alarm has been reported and to try communicating with anyone at the premise in an effort to verify a real alarm has occurred. Secondly, the SCMS can easily be reached by the dwelling owner or facility manager if that person is having problems with using or understanding the system.

The limitation of most existing security systems is in the wiring required to install them. This is true even with supposedly wireless security systems because electric power wiring, keypad wiring, and siren and telephone lines are usually required. In some newer systems, the keypad, dialer, and in some cases the siren are combined into a single unit, along with a wireless receiver; however, this still requires running power and telephone wiring to the unit, which is most often wanted on the wall in a hallway near an entry/exit door. Such systems also compromise security, since all of the dialer and siren functions are built into one unit. Simply destroying this unit would stop the alarm from being annunciated and communicated to any remote monitoring center. Combining the above-described power line communication technologies into the Security/Message Center offers some significant advantages and novel feature services and performance that are especially suited for homes, small businesses, apartments and dormitories.

First, the human interface, commonly called a keypad 74 (FIGS. 2 and 3) in security systems but is now a complete message center, is designed so that it can be mounted on an electrical box in place of the light switch. The keypad not only is powered by the electrical wiring, but also uses these same electrical wires for communications. The same unit includes a battery for back-up in case of power loss. If power is lost, communication can still take place.

The message center is, therefore, easily located on the wall by an entry/exit door without additional wiring. For the Security/Message Center to communicate with the SCMS, another device is added to the system. This is a special telephone modem that plugs into an electrical outlet anywhere in the house. This modem includes a transceiver of a type shown in FIG. 1 and therefore has the ability to communicate with the Security/Message center by way of the power lines, and includes a telephone line connector so that the modem can be plugged into the nearest telephone outlet.

Second, with the use of the Speakerphone capabilities already included in the Security/Message Center, telephone conversations can also be held by way of communications over the power lines, through the dialer. Since complete telephone conversations can be held, the Security/Message Center also becomes a home intercom system by placing added Security/Message Centers throughout the home or business with dedicated extension numbers. These same Security/Message Centers also become annunciators in the case of alarms, so that alarm conditions can be easily announced throughout the premise. As previously discussed, e-mail messages can also be sent by way of power lines to the power line modem and to the telephone line. Other devices capable of communicating over the premises power distribution lines with Security/Message Center include lighting control switches, output switches for connection to garage door openers, sirens powered off the premises power distribution lines, and security sensors such as motion detectors replacing light switches to detect intruders as well as turn out lights when a room is no longer occupied.

Third, when used in apartment complexes or dormitories, the Security/Message Centers communicate by way of the premises power distribution lines to send the alarm messages, as well as voice and e-mail messages, to a single central power line modem. This saves significant costs of needing a power line modem in each apartment or dormitory room. For added security in large establishments such as apartment complexes and dormitories, more than one central modem can be used. In this mode of operation, if one central modem is attacked or damaged, whether intentionally or unintentionally, the message would be immediately reported and the system will not be compromised.

Fourth, a line disconnect sensor connected between an electrical wall outlet and protected appliances or electronic equipment, such as TVs, VCRs, PCs, and stereo equipment, can detect whether the device has been unplugged. As soon as a line disconnect is sensed, this alarm message is communicated to the Security/Message Center. If the proper security code has not been entered, an alarm condition would be communicated to the central power line modem and thereafter to the premise alarm system or the SCMS.

RF Signal Bridge and Two-Way RF Signal to Power Line Communications

Communication over the premises power distribution lines supplied electric power by a single power transformer can be accomplished using the technology previously described. However, it is well known that communication through the premises power distribution lines is generally blocked by the transformer that supplies the power so that power line devices cannot communicate to the power distribution line wiring on the other side of the transformer.

Figure 4:
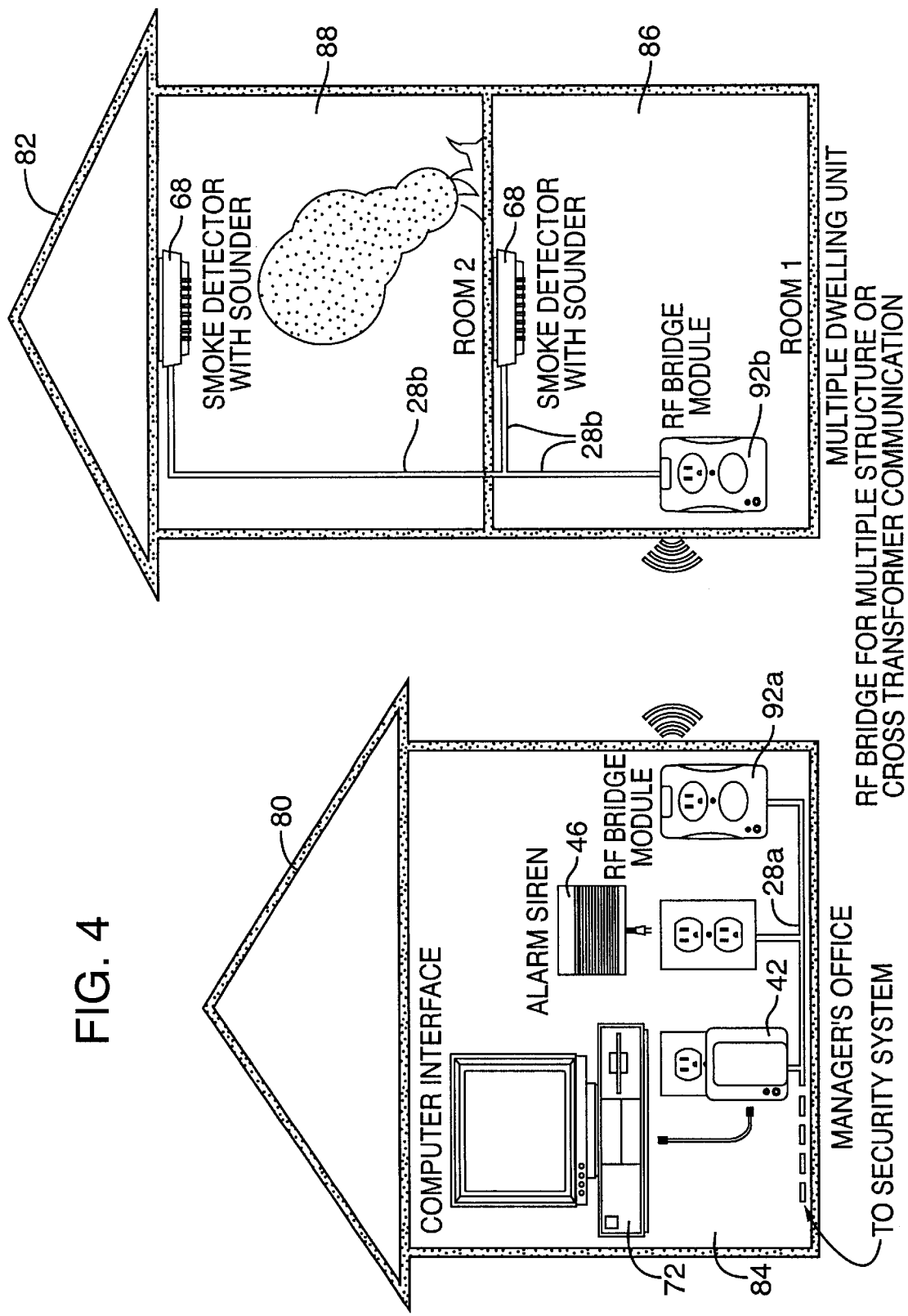
FIG. 4 is a pictorial diagram showing the use of an RF signal bridge for multiple structure or cross transformer communication in a fire system of the type shown in FIG. 3.
Figure 5:
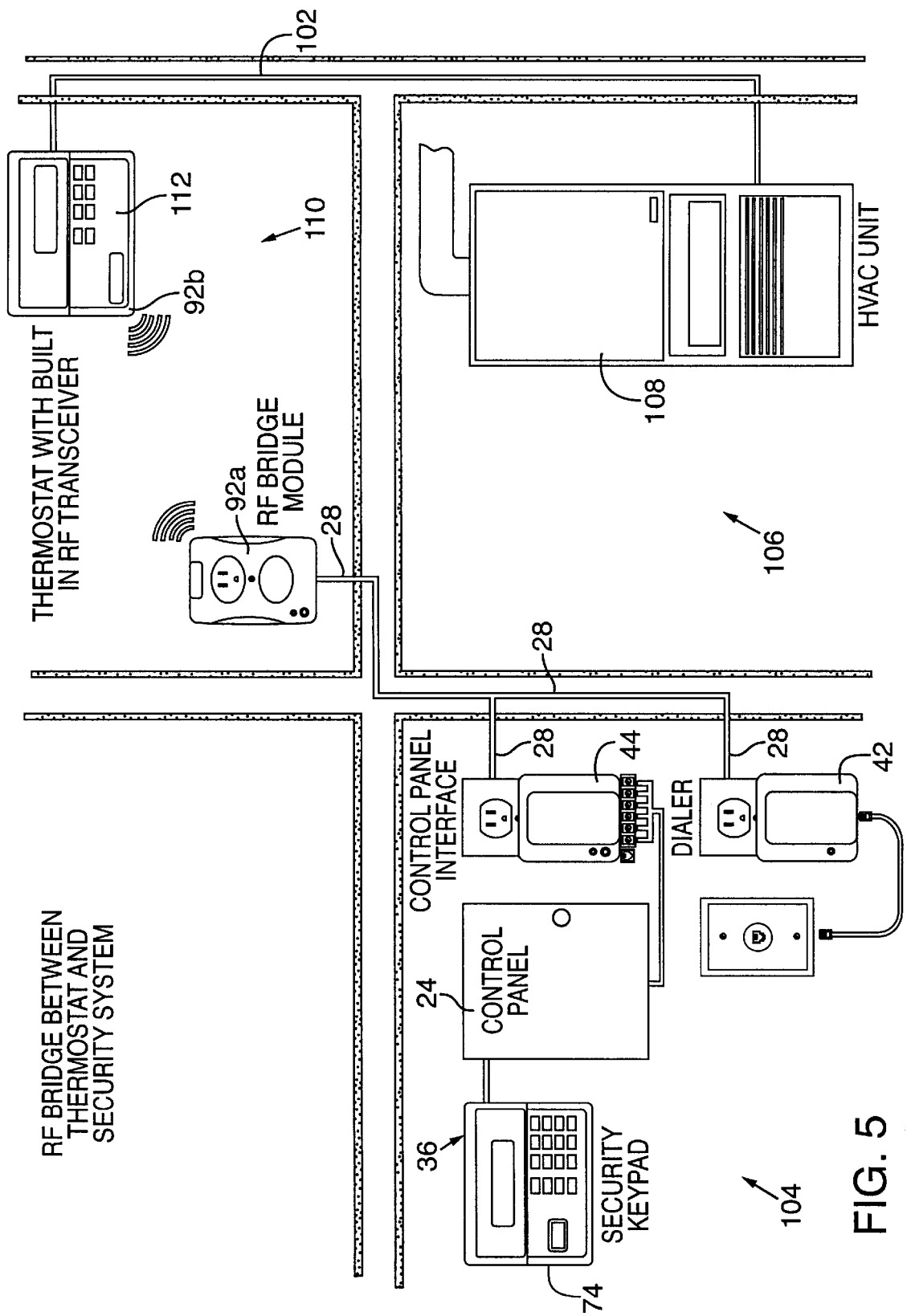
FIG. 5 is a pictorial diagram showing the use of an RF signal bridge between a thermostat and a security system installed in the same premises.

There are many cases in which it is desirable to send signals from one power line circuit to another. For example, in a hotel in which each floor is supplied by a separate transformer, it would be desirable to communicate messages to and from a single control center in the building to all of the hotel rooms. In the case of an apartment complex, in which each building is supplied electric power by a separate transformer, it might be desirable to send alarm or trouble messages from all of the apartments to the manager's office located in a different building. FIG. 4 is a pictorial diagram showing the use of an RF signal bridge for multiple structure or cross transformer communication in a fire system of the type described above with reference to FIG. 3. In a case of a thermostat in a home, which thermostat is generally wired directly to the HVAC system by way of a 24 VAC circuit that is separated from the premises power distribution lines by a transformer, it might be desirable to send the thermostat measurement readings to a security system without placement of additional wiring. FIG. 5 is a pictorial diagram showing the use of an RF signal bridge between a thermostat and security system installed in the same building.

Based on the transceiver and its uses disclosed above, it is possible for the first time on an FCC approved device not only to transmit signals through the premises power distribution lines but also to use them as an antenna to intentionally radiate the signals. It is possible, using the example depicted in FIG. 5, that the thermostat wiring, if it is long enough and runs close enough to the premises power distribution lines, will couple enough of the radiated signal so that it can receive control messages directly from the premises power distribution lines. However, it is also possible that a power line transceiver in the thermostat may not be able to radiate a sufficiently strong signal to communicate back to the power lines.

Therefore, what is wanted is not only a highly reliable means of communicating throughout the premises power distribution line wiring, but also a means of coupling those signals reliably to nearby wiring, such as HVAC wiring or premises power distribution lines connected through separate transformers.

This can now be accomplished through an RF Bridge circuit. The RF Bridge is an RF receiver circuit that is designed to receive the radiated signals from nearby premises power distribution lines. This receiver circuit can be of a design identical with that used in the power line transceiver previously described with reference to FIG. 1, except that it has the addition of either an inductance or a radiation antenna situated to receive inductance or radiation signals, rather than signals electrically conducted through the premises power distribution lines.

This RF receiver circuit, after receiving the inductance or radiation signal, can then decode or demodulate the message received from the other power distribution lines, and, if desired, can retransmit this message into its own power distribution line wiring. Thus, the RF Bridge can act like a wireless repeater, except that it receives signals radiated by one power line circuit and repeats those signals to a separate power line circuit.

With reference to FIG. 4, two separate building structures 80 and 82 house, respectively, a manager's office 84 equipped similarly to the manager's office in area 70 of FIG. 3 and a multiple dwelling unit with two rooms 86 and 88 equipped similarly to the rooms in areas 64 and 66 of FIG. 3. In manager's office 84 of building structure 80, telephone line dialer 42 and alarm siren 46 connect through premises power distribution lines 28a to an RF bridge module 92a. In rooms 86 and 88 of building structure 82, smoke detectors 68 connect through premises power distribution lines 28b to an RF module 92b. Because each of RF bridge modules 92a and 92b operates as a transceiver, RF bridge modules 92a and 92b transmit and receive modulated carrier signals conveying information. For example, RF bridge module 92a transmits through its antenna a test signal conveying information for reception by the antenna of RF bridge module 92b. RF bridge module 92b relays some or all of the test signal information to smoke detectors 86, which return to RF bridge module 92b reporting signals for transmission back to RF bridge module 92a and eventual delivery through premises power distribution lines 28a to the security system computer interface 72. Although RF bridge modules 92a and 92b in this example are equipped with radiation antennas, skilled persons will appreciate that under the appropriate circumstances communication between bridge modules could be accomplished within inductance antennas, as permitted by FCC regulations.

With reference to FIG. 5, a single building structure 100 with three physically separate areas is configured to have an HVAC electric circuit 102 that is separate from the premises power distribution lines 28. An area 104 contains an alarm system 36 configured as that shown in FIG. 1. An area 106 houses an HVAC unit 108, and an area 110 contains a thermostat 112 with a built-in transceiver 92b. Premises power distribution lines 28 are routed within and between areas 104 and 110, and the power lines of HVAC electric circuit 102 are routed between areas 106 and 110. An RF bridge module 92a transmits and receives modulated carrier signals to and from thermostat 112 in a manner analogous to that described with reference to FIG. 4.

As indicated in the description of FIGS. 4 and 5, if two-way communication is desired between the two separate premises power distribution line circuits, one RF Bridge is connected to each power distribution line circuit. Thus, each power line is able to receive the signals radiated from the other power line through the RF Bridge. Transmitting messages is accomplished as is done normally through the power lines. Using this invention it is then possible to send a message when an alarm system of a building is being armed and to turn off all of the lights of the building (except those purposefully left on for security purposes). This message can then be sent through from one power line circuit to the next power line circuit until all of the power line circuits have passed this message on to all of the controlled lights in the building.

Since no other power line communication technologies were previously approved as intentional radiators, none has been previously able to accomplish this. A significant number of benefits have, therefore, been gained by this invention.

It is also possible to send messages from the power lines to devices, such as battery operated devices, that are not connected to any power line wiring. These can be battery-operated smoke detectors, security door or window sensors, or portable remote control devices that can arm and disarm the security system or control home appliances. In fact, any device that previously included a one-way transmitter can now achieve two-way communication by simply adding the RF Bridge receiver. These devices will then be able to receive the same messages sent through the premises power distribution lines and will then be linked into the same network.

For these battery operated devices to send messages to the power line network, the receiver that was previously used with its one-way transmitter is connected to a power line transmitter to repeat the message to the power line circuit. If these battery operated devices are now designed to use transmitters tuned to the same frequency as that of the power line transceivers, then a simple RF Bridge, as previously described, can be used to receive messages not only from nearby power lines but also from the battery operated devices to create a complete network of two-way communication.

Such a complete network has many significant advantages. One major advantage is that signals sent through the power lines are naturally coupled throughout the house or building and, therefore, significantly reduce the range of reception to the battery operated devices. For example, using this new means of communication, a security door sensor might be located fewer than only ten feet away from the nearest power line; whereas, while using the prior art, the security door sensor would have to receive its messages from a control unit that could be located 50–100 feet away with metal objects in the way that force the signals to be reflected multiple times before being received by the door sensor's receiver. This enables the receiver design to be less expensive and draw less current, thus enabling longer battery life.

A single network that can connect power line devices and battery operated devices, as well as nearby power line circuits, creates a complete network for control, alarm, sensing, and messaging products that can interact anywhere in the building or building complex using inexpensive transceivers.

Master-Slave Command Assurance Algorithm

Figure 6:
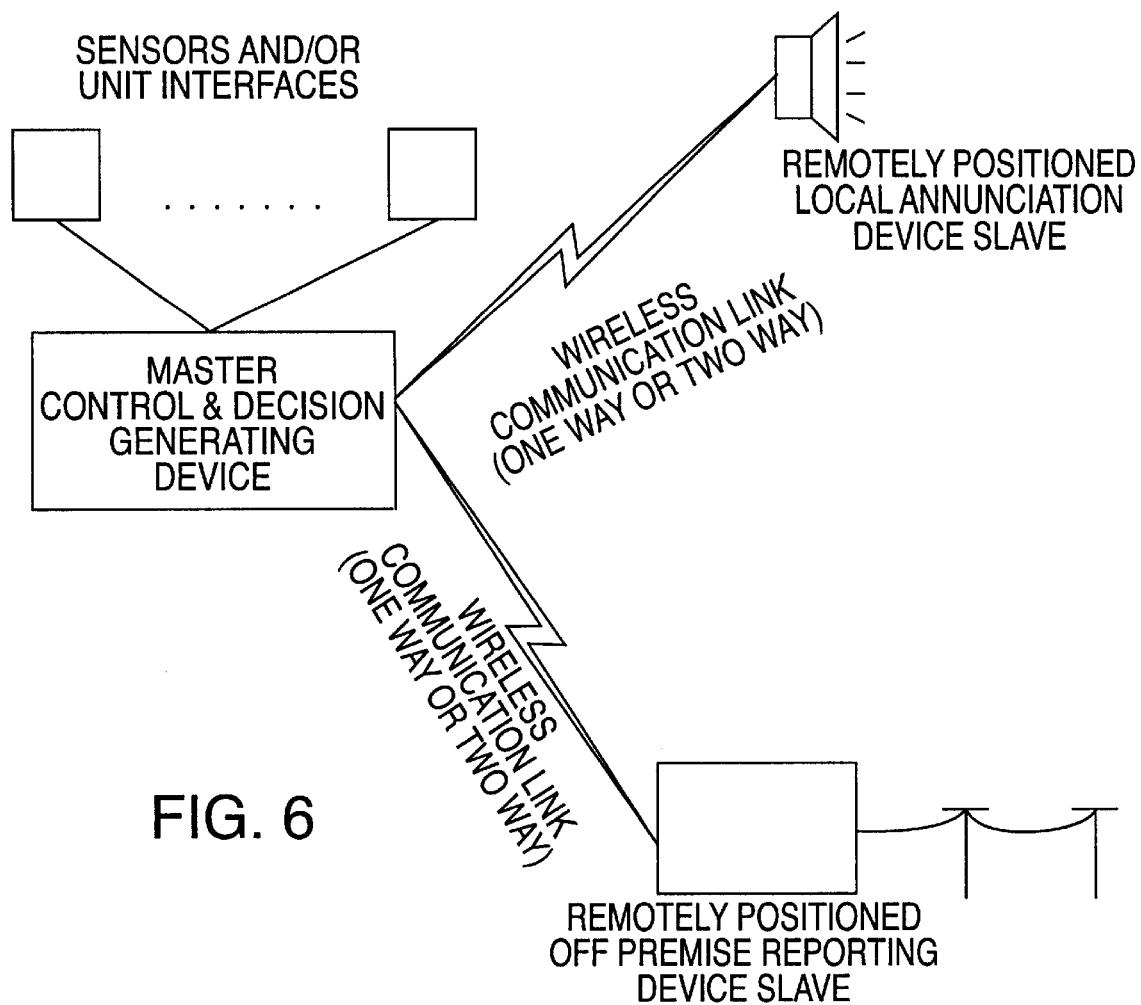
FIG. 6 is a pictorial diagram of a sense/respond system implemented in a Master-Slave response command structure.

Two-way communication can be used to correct for a communication link failure that might keep a remote annunciation device from responding to an emergency response circumstance. The present invention is implemented in a command structure in which there is two-way communication between a Master unit, which is a system element that makes major system decisions, and one or more Response Slave devices. The Response Slave can be any device, which, under command of the Master unit, carries out, in whole or in part, a delayed response to an activation condition. Examples of Response Slave devices includes telephone line communicators and wireless transmitters (e.g., cellular, cellular side band, and dedicated band) that report an emergency condition to a central monitoring station and local annunciation devices (e.g., audible sirens and bells, strobe light, and vibration devices) that alert occupants of an existing emergency condition. FIG. 6 is a pictorial diagram of a sense/respond system implemented with a Master unit and two exemplary Response Slave devices.

The Response Slave devices are typically hidden in locations where the devices are not easily seen or accessed. They usually have few or no displays or controls so that they are unlikely to attract the attention of an unauthorized intruder. On the other hand, Master units are often combined with user interfaces and are, therefore, readily visible and accessible. Even when they are not conspicuously located, the Master units may be large and bulky and, therefore, readily recognized if happened upon.

The responses of the Response Slave devices are delayed (typically from several seconds to minutes) while the system (and its interaction with the environment and/or users) verifies the need for the emergency responses carried out by the Response Slaves. Examples of verification include entry delays to give an authorized occupant time to enter a code or biometric information that assures the system of an authorized entry and includes verification of sensed emergencies such as a verified fire algorithm. If during this evaluation period an emergency condition is not verified, existing systems do not activate responses of the various Response Slave devices, which are not provided information that they were to be standing by to respond.

This invention informs the Response Slave devices at the beginning of a Master unit evaluation process that they may be called upon to respond in a certain manner. It is during this evaluation period that the continued functioning of the Master unit is at its highest risk of functional cessation. For example, intruders may smash a Master unit, especially those in which the user interface is combined with the Master unit in the same physical enclosure, or fires may damage the Master unit. Currently available systems would then not provide the proper response, thereby increasing the risk of personal injury or property damage.

Figure 7:
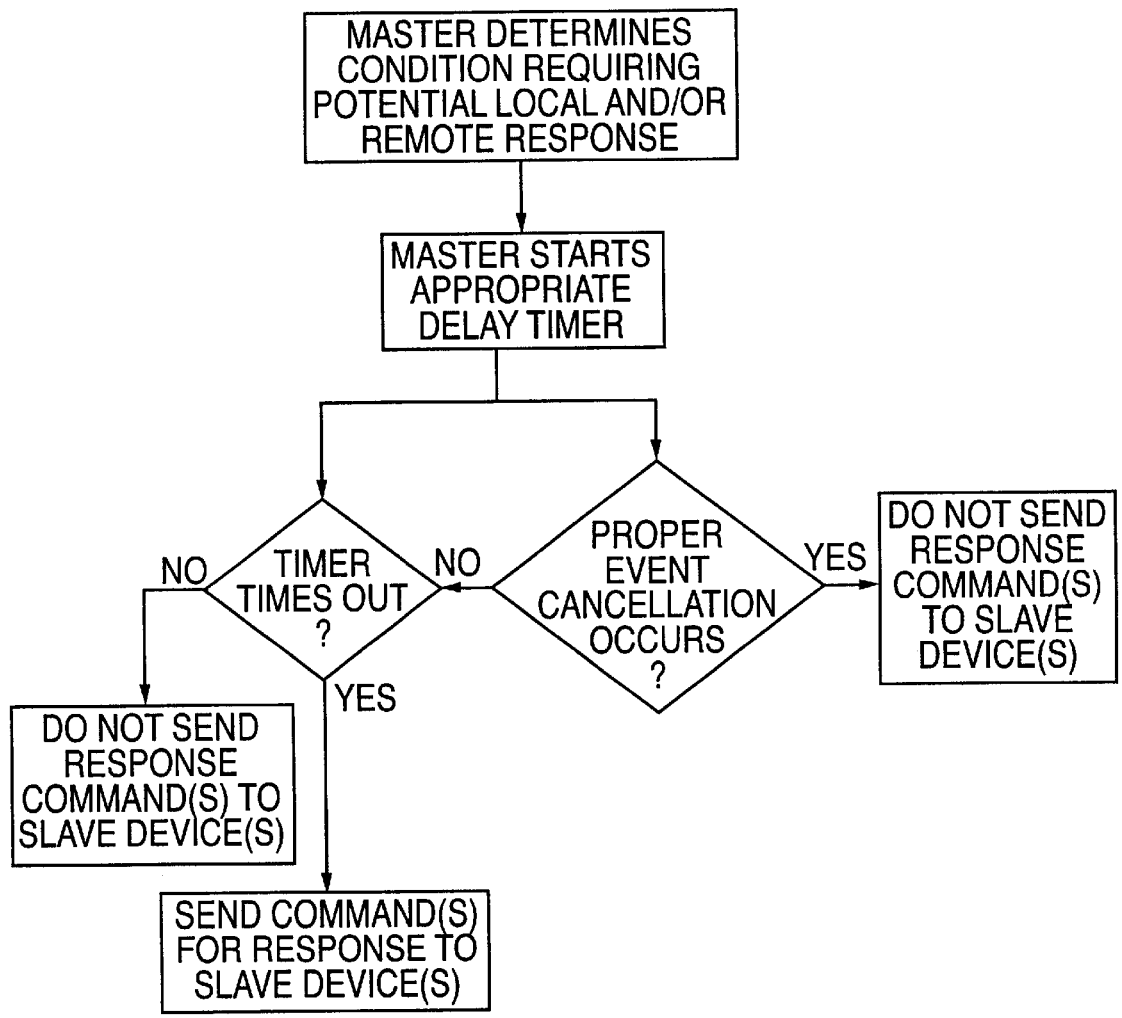
FIG. 7 is a flow diagram showing the processing steps carried out by a Master Unit and Response Slave devices of the system of FIG. 6 in accordance with the prior art.

FIG. 7 is a flow chart that outlines the basic algorithm implemented in prior art Master unit-Response Slave systems. In this algorithm, the Master unit carries out all actions, delays, and decisions. The Response Slave devices are unaware of a potentially life or property threatening situation until the Master unit makes its final algorithmic determination.

Figure 8:
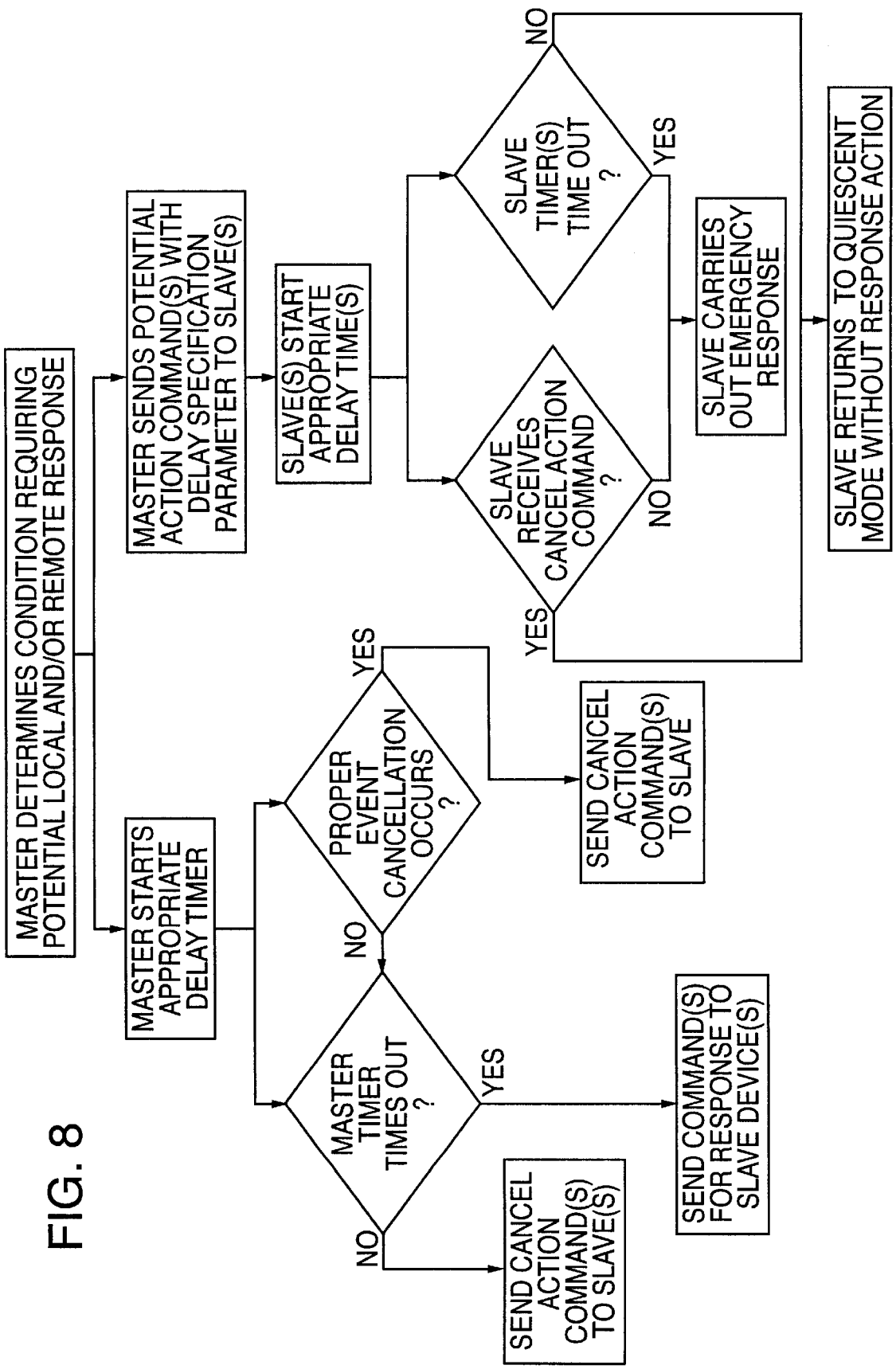
FIG. 8 is a flow diagram showing the processing steps carried out by a Master Unit and Response Slave devices of the system of FIG. 6 in accordance with the present invention.

FIG. 8 is a flow chart that outlines the algorithm implemented in accordance with the present invention. In this case, both the Response Slave devices and the Master unit become immediately aware of a situation requiring a potential response. In the absence of a cancel action command to the Response Slave devices, they are capable, as a result of the application of the invention, of taking independent action.

Several innovative applications arise out of the invention. Any Master-Slave application in which a delayed critical function is to be performed by the Slave device is subject to interruption by human events (e.g., an intruder damages the Master unit or the communication link from the Master unit) or process (e.g., flames destroy the Master unit or the communication link from the Master unit) events. For situations in which the delayed critical function is local (life safety) or remote (property protection and/or life safety) function of importance to life or property protection, the invention provides a higher than previously available assurance of proper action and response. As wireless technologies (one-way and two-way RF (Radio Frequency)); one-way and two-way IR (Infrared); one-way and two-way PLC (Power Line Carrier) technologies gradually supplant wire and cable as the Master-Slave communications link, the ability of the invention to further ensure proper delayed response becomes increasingly critical to the life and property protection functions of these devices.

Master-Slave relationships are becoming increasingly common in other control applications, such as HVAC (Heating, Venting, and Air Conditioning) and lamp and appliance control applications. Comfort and cost considerations specify that remote Slave devices (A/C switches and appliance switches) are periodically updated with proper status to continue operation. In the event that communication is lost, it is not desirable for a remote Slave device (such as a furnace or air conditioner) to remain operating indefinitely. It is important for reasons of comfort, cost, and safety that these devices be safely and properly turned off when it is clear that communication has been lost between the decision making and/or sensing devices and the response device. This invention provides for such action.

Home Server Music System with Power Line Distribution

This system uses the higher bandwidth frequency band (1.705–10 MHz) and represents a significant advance in music distribution in the home. Skilled persons will appreciate that the transceiver circuit design set forth in FIG. 1 could be modified to accommodate the wider bandwidth and different center frequency to operate the home server music system. Music and audio systems for the home currently can be distributed through two methods. First, separate sound systems can be installed in rooms throughout the home. Second, a home can be wired to send music and audio signals down special wires to speakers placed in the various rooms desired. The latter has the benefit of using one central sound system but is prohibitively expensive for the average homeowner, because of the very high installation costs as well as the added audio switching gear required. Wires must also be run to the various rooms for keypads or other control devices so that the desired audio can be selected from each room.

There have been products that attempt to send music and audio signals through premises power distribution line wiring. The sound quality has, however, been poor and plagued with noise and interruption problems. Through the use of the above-described innovations in power line transceiver design, however, reliable signals can now be sent throughout the AC wiring in the house. Moreover, this system incorporates the ability to send the audio signals by way of digital communication using new compression techniques. The most commonly used compression format now used, MP3, which stands for M-PEG layer 3, represents a new industry standard for compressed audio and is now being used for Internet music distribution.

The improvements in the above-described transceiver design, together with the use of MP3 or other compressed digital formats, now enables distribution of CD quality audio through the power lines. The low bandwidth transceiver design discussed above now also allows for the communication of room audio control settings through the premises power distribution lines. Moreover, because these products use the unique listing under FCC as intentional radiators, this system also allows for inexpensive wireless headsets that receive the signals sent through the power lines that decode the compressed audio and, therefore, allow for completely wireless headphones with CD quality music and audio. These headsets can easily receive signals strong enough to listen anywhere in the dwelling, and even close to the dwelling in the yard outside.

At the heart of this system is a home server, which is an inexpensive PC with a hard disk drive, with an operating system that includes the software to compress audio from CDs, FM/AM radio inputs, or download compressed audio from the Internet. The system can store and manage thousands of songs by, for example, composer, music type, or play lists. The server can also include the higher bandwidth power line transceiver, enabling it to transmit multiple simultaneous music channels over the AC wiring and to receive control commands from the room audio selectors. Along with the server are modules that include a power line transceiver, audio decompression circuitry, and amplifier outputs. These modules are plugged into the individual rooms throughout the house. The amplifier outputs are connected to speakers.

Room control units can be plugged into a nearby outlet or mounted in an electrical box in place of the light switch. The control units send commands to the server, such as what type of music is desired, whether to listen to the radio, or to download new music from the Internet. The control units also send volume, balance, and tone control commands to the amplifier modules in the room.

Wireless headsets come in two versions. The basic model includes a receiver tuned to the power line transmission frequencies, audio compression circuitry, and amplifier circuits to drive the headphone speakers. Volume, balance, and tone controls are also built in. An infrared remote control can be used to select the channels for the headsets, by way of infrared receivers on the room control units. More expensive model headsets also include an ability to store a number of songs, for example, an hour's worth of music or more. The headsets can receive downloaded new music whenever desired, although it takes as long to download as it does to play it back. Then the headsets can be taken on trips away from the dwelling, such as in the car or jogging, to permit play back of the music then.

These wireless headsets could be expanded into wireless two-way phones, if desired. By including a transmitter in the headset and a receiver that can plug into an AC outlet, the headsets become capable of full telephone operation. The form could be changed to that of a typical wireless telephone, of course, which could communicate by way of the premises power distribution lines to the home server and thereby would enable communication by way of the telephone lines or whatever other type of communications port might be used, such as cable TV lines, or new high speed telephone lines.

Another unique feature of this home server music system stems from its closed system characteristic, meaning that it does not send music to other systems but is used only by devices specifically designed to work with the system of this invention. This is the ability to receive sample songs through the Internet that can be played once or twice for the purpose of letting the system owner hear the music before deciding to buy. If the system owner likes the music, he or she can buy it with the proper security authorization, and the song will then be saved and the owner's account billed the appropriate amount. If the song is not wanted, it will be erased from the system. This enables a very useful service by which system owners can list the types of music or performers the system owners like, and new songs that fall into those predefined categories can be sent to them free for their review. System owners would need to pay only if they like the songs, and they can easily add new songs to their custom play lists. The songs would already come with header information that identifies the artists and music genre, so that music can be sorted accordingly. As can be seen, this service could be offered only if the system was secure from copying or sending these songs onto other systems.

Skilled persons will appreciate that other audio products besides music can be distributed in the same way, such as talking books or radio shows. A weekly news radio show, for example, could be sent to subscribers for playback and listening at their convenience.

Digital Jukebox Example

The following description of a Digital Jukebox presents a more specific example of a home server music system. Digital Jukebox represents a new way to listen to and buy music for the home and operates around a home music server that can store over 2000 CD quality songs in digital format. It incorporates a complete Music Computer that can capture, compress, and store songs from CDs or downloads from the Internet, and then can transmit CD quality audio throughout the home.

Figure 9:
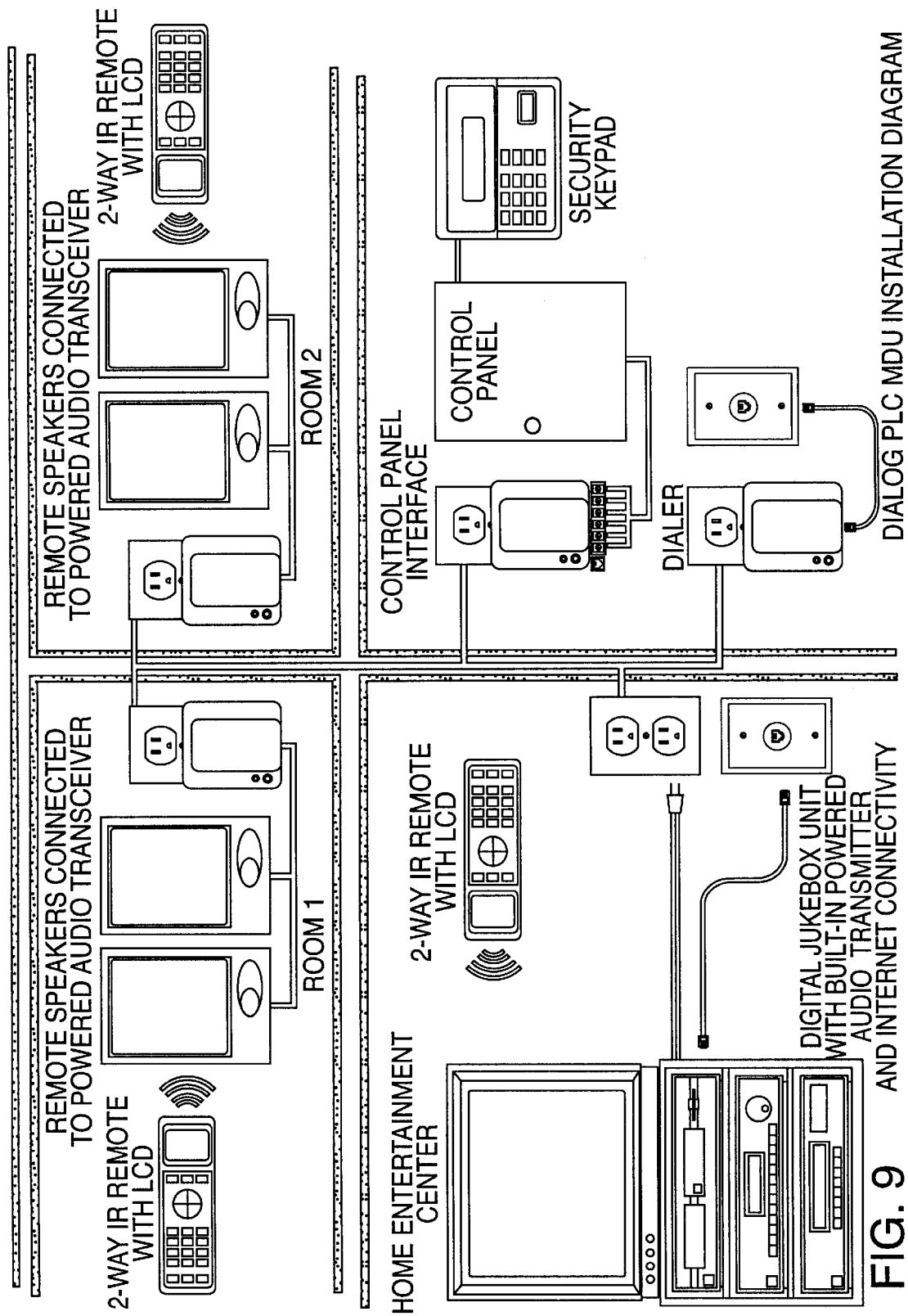
FIG. 9 is a pictorial diagram of a digital jukebox set up in a multiple-room facility.

Although Digital Jukebox contains a low-cost Pentium class computer with a hard disk drive, it is designed to look and operate more like a CD player with built-in music library. It is designed to sit on the stack of audio equipment in the home, replacing the CD player in most cases, and operates from a simple hand-held IR remote control. In its simplest application, the user can take his or her library of CDs and store the complete albums or selected songs in Digital Jukebox. Over 2000 songs or more than 200 complete CDs can be stored this way. Storage can easily be increased with the use of a larger hard drive at a higher cost, or an additional hard drive can be added later when needed. The user can then instantly access any song from the complete library and put the CDs away. FIG. 9 is a pictorial diagram of a Digital Jukebox set up in a multi-room facility to use the various features described below.

Octave Audio System's Internet Services (OASIS)

The most basic configuration of Digital Jukebox also includes a 56 kbaud modem capable of hands-free automated Internet access, which makes available a variety of new Internet services. For example, a Personal Music Selection Service could be made available. Once this service has been selected and the user has described a music preference, Digital Jukebox automatically calls up a dedicated server, which is herein called an Octave Audio System's Internet Service (OASIS) Internet Server, and downloads a few songs each day. The user will also gets descriptions of other songs or new albums of interest to the user. These downloads can take place at night so that they will not interfere with normal telephone usage. The next day the user can listen to the new song and decide whether to add it to the user's music library. Many songs could be available for free, such as MP3 free songs on the Internet, or there may be a small additional fee if the song is being sold from a professional record label. OASIS keeps track of all songs kept or purchased so that it can better select songs for the user. This service is not limited to music. Another service called Personal Radio Service allows the user to download talk shows, sports events, Internet radio broadcasts, or talking books. The user can then listen to them at the user's convenience, since these audio tracks are kept in Digital Jukebox's temporary library until they are ready to play them back. Personal Radio Service has an added service charge associated with it, to be determined.

When a user enrolls with OASIS, a record of the user's library of music can be stored in the OASIS customer database. This can include both the CDs the user has added to the music library, as well as the downloads the user has chosen to keep. This allows OASIS to better select music choices for the user, avoid sending selections that the user may already have in the form of CDs, and offers the benefit of acting as a form of insurance to protect the choices the user has downloaded. The database stores the song names, not copies of the actual music. If for some reason a Digital Jukebox was damaged or failed, the selections the user downloaded (and in many cases paid for) can be restored.

OASIS also includes a standard web site interface for users to contact through a PC. This will enable the user to manage and organize the music library and play lists, as well as to make music and service choices through the PC. The Digital Jukebox can include a TV interface option in the future that can also allow a similar graphical user interface without the need of a PC.

Powered Audio

Adding Powered Audio technology to the Digital Jukebox enables broadcast of multiple channels of personal audio throughout the home by way of power line communications. Powered Audio Speaker Modules can be plugged into any AC outlet in the home and connected to either a stereo amplifier or directly to speakers. The Speaker Modules also come with an IR sensor and are capable of IR remote control communication. The user can then select and play music from any room in the house. Since the music is stored and transmitted digitally, there is no loss of CD quality. Moreover, since multiple channels are available, completely different music can be simultaneously playing in different rooms. Each user in the home can have his or her own ID, which allows the user to create personal Music Play Lists and Personal Music Libraries, all stored in Digital Jukebox, yet controlled by and listened to in whatever room the user might like.

Powered Audio also allows modem communication through the power line, so even if there is no convenient telephone jack near Digital Jukebox, a power line modem can be plugged into an AC outlet near a telephone jack somewhere else in the house and can provide a communication port to the Internet.

Listen Anywhere Headphones and Music Players

Another feature of Powered Audio is that it allows for inexpensive wireless headphones that can listen to Digital Jukebox music and audio anywhere in the house, as well as in the yard outside the house.

Digital Jukebox can also be compatible with many of the new digital music players that are now becoming popular. Digital Jukebox can act as the library of songs for these players and makes downloading music into the players much easier, without the need of a PC and without using up the PC hard drive for music storage.

Digital Jukebox incorporates the low bandwidth power line communications for sending and receiving control information. This enables the easy integration of Home Security and Home Automation functions. For example, verbal fire alarm warnings can be audibly annunciated throughout the house, eliminating the need of guessing what type of alarm has occurred. Added instructions for how to evacuate the home or respond to emergencies can be added for helping children and the elderly.

With the addition of a high quality two-way fob for arming and disarming, using the above-described RF bridge technology, it is practical to eliminate the need for the keypad in the security system. All status messages can be announced audibly, rather than requiring the user to stand near the keypad. This would include not only the standard message: "System arming, you have 60 seconds to exit, press your arm button again if you need more time," but it can also make the non-ordinary functions far easier to respond to. One such message could be: "System can't arm; the back door is still open." Another such message could be: "A low battery signal has been received from the living room motion detector. If you would like a service technician to call you to install new batteries, press the YES button on your fob. If you would like to replace these batteries yourself, press the NO button on your fob and Digital Jukebox will download instructions tonight to give you step by step instructions." Digital Jukebox not only can provide audible verbal announcement alarms, but also can play audio tracks of barking dogs, verbal commands to leave the house, and similar sounds and messages.

Digital Jukebox can, therefore, enhance the interactivity of the security and home automation system dramatically. Some other simple improvements include notifying by e-mail parents at work when their children arrive home after school and send their disarm signal to Digital Jukebox. Voice messages can be left for the children as well to, for example, remind them of tasks or appointments.

Vmail and Message Center

The addition of a plug-in microphone enables Digital Jukebox to record voice messages and send them through the Internet to others, such as friends and family members. These Vmail messages can be heard from any PC with Internet access, or if the family member owns a Digital Jukebox, he or she can listen to the better-than-telephone-quality audio from the convenience of the living room and send back a return Vmail message without ever touching a PC. Such long distance messages will not cost extra for those with unlimited Internet access arrangements. Software is also readily available that can turn Digital Jukebox into a multipurpose answering machine with Caller ID.

Any or all of these services can then be sent toward the Security, Control, and Message Center. A keypad can be plugged into any AC outlet in the dwelling to display when e-mail, Vmail, voicemail, or other messages are waiting; or these messages can be annunciated verbally through the audio system without the need of a keypad. Therefore, when the user wakes up in the morning or arrives at home from work, the user can easily see or hear any messages that might be waiting. All of these messages can then be played back through Digital Jukebox where they are stored.

Message services can also be provided to the home. Digital Jukebox automatically downloads these messages during its nightly call-in process, or more often during the day if desired, and these messages can then be sent through the power lines for display or audio annunciation anywhere in the home. This can take the form of personalized morning news services, stock reports, sports highlights (including audio playback), hurricane warnings, school closures, travel and sightseeing information for vacations, traffic reports, and similar information.

Audio Help Features

Enrolling Digital Jukebox to OASIS and the many services available are handled through standard Interactive Voice Response, using the remote control to respond to options and enter information, such as credit card numbers and e-mail addresses. It is also be possible to handle these functions through a PC by logging on to an OASIS web site and using a standard Graphical User Interface. If the user decides to use the audio-only features, however, Digital Jukebox has available a full list of help topics and instructions, all digitally recorded audio that can take the user step by step through an instruction process. Each instruction set can be repeated or paused from the remote control.

If the user cannot find the proper help topic, or still has questions that have not been answered, Vmail Help can be added as a final option. The user can then record questions and send them to OASIS. An audible Vmail response can be sent back relatively quickly, answering the questions presented. This represents a more efficient way of handling technical support than live telephone calls because support personnel can easily be set up to handle these messages from their homes, and the user hears the instructions. Once a common question surfaces that was not included in Digital Jukebox, it can be added to the list of new downloads to all users when their systems next call into OASIS. The OASIS service also includes, therefore, all latest upgrades in software and help instructions and can be used to promote new services.

It will be obvious to those having skill in the art that many changes may be made to the details of the above-described embodiments of this invention without departing from the underlying principles thereof. The scope of the present invention should, therefore, be determined only by the following claims.

What is claimed is:

1. A life safety system using an electric power line communications system operatively associated with premises power distribution lines of an electric power distribution system to provide through the premises power distribution lines highly reliable communication links among modulated carrier signal receiving devices electrically coupled or located in proximity to the premises power distribution lines to convey hazardous condition alarm signals, comprising:

multiple hazardous condition detectors adapted for placement and receiving electric power at different locations where premises power distribution lines are routed to make electric power available, each of the detectors having an identification address and producing a hazardous condition signal in response to detection of a hazardous condition in the location of the detector, the identification addresses in association with the power distribution lines contributing to establishment of communication links among the detectors;

a power line transceiver operatively associated with each detector and designed to transmit and receive over the premises power distribution lines modulated carrier signals conveying information over the communication links, the power line transceiver operating in a transmitter mode as an intentional radiator to emit the modulated carrier signals by transmitting them at a frequency band and a power level sufficient to form by electrical conduction a communication link with a modulated carrier signal receiving device that is electrically coupled to the premises power distribution lines, and to form by at least one of electrical induction a communication link by coupling across electric power distribution line phases or electromagnetic radiation a communication link with a modulated carrier signal receiving device that is located in proximity to the premises power distribution lines; and the transceiver of each detector that produces the hazardous condition signal emitting a modulated carrier alarm signal over the premises power distribution lines for delivery to other ones of the detectors by the communication links to enable production of alarm signals at the premises locations of the detectors.

2. The system of claim 1, in which the modulated carrier signals conveying information include an acknowledgment signal verifying receipt by the power line transceiver of the information conveyed.

3. The system of claim 1, in which the identification addresses of the multiple detectors include addresses identifying a group of the detectors at premises locations in a defined space to prevent enabling production of alarm signals by a detector not included in the group.

4. The system of claim 3, in which the premises locations in a defined space include an area in a multiple dwelling unit.

5. The system of claim 3, in which the premises locations in a defined space include an area in a multiple building complex.

6. The system of claim 1, further comprising a system domain controller to which the multiple detectors are operatively connected to provide remote monitoring of the multiple detectors.

7. The system of claim 6, in which the system domain controller monitors the alarm signals produced.

8. The system of claim 6, in which the system domain controller polls the detectors to verify proper establishment of their communication links.

9. The system of claim 6, in which the system domain controller communicates with the detectors to verify their operating conditions.

10. The system of claim 6, further comprising a device that is capable of establishing a communication link to a remote monitoring station.

11. The system of claim 10, in which the device includes a telephone dialer or a modem.

12. The system of claim 6, further comprising a monitoring control unit that responds to the system domain controller by direct premises power line connection or an electromagnetic radiation communication link.

13. The system of claim 6, in which the system domain controller communicates to a security system information obtained by the remote monitoring.

14. The system of claim 6, in which the system domain controller responds to the hazardous condition signal by delivering to the detectors a reset signal that prevents the enablement of production of alarm signals until there is a recurrence of the hazardous condition signal after a predetermined time.

15. The system of claim 1, further comprising a controllable light switch device that responds to the emitted hazardous condition signal sent over the power distribution lines by activating for purposes of emergency lighting a lamp that illuminates an occupant evacuation path in response to the detector that produced the hazardous condition signal.

16. The system of claim 1, further comprising a remote annunciator that responds to the hazardous condition signal by producing a warning signal that is perceptible to an occupant in the vicinity of the remote annunciator.

17. The system of claim 16, in which the remote annunciator includes one of a visual device or an audio device.

18. The system of claim 16, in which the remote annunciator is configured to indicate a premises location of the device that produced the hazardous condition signal.

19. The system of claim 18, in which the premises location is a region of a multiple dwelling unit.

20. The system of claim 1, in which the transceivers of the other ones of the detectors respond to a signal that interrupts or terminates the production of alarm signals by selected ones of the multiple detectors associated with the location where the hazardous condition arose.

21. The system of claim 20, in which each of the multiple detectors further comprises, in operative association with its corresponding transceiver, an actuator providing the signal that interrupts or terminates the production of alarm signals by selected ones of the multiple detectors associated with the location where the hazardous condition arose.

22. The system of claim 1, in which the transceivers of the other ones of the detectors enable receipt from an actuator operatively connected to the premises power distribution lines a signal that interrupts or terminates the production of alarm signals.

23. The system of claim 1, in which the modulated carrier signals conveying information include detector programming signal information.

24. The system of claim 23, further comprising a computer to which the multiple detectors are operatively connected at least partly over the premises power distribution lines to form a communication link for the detector programming signal information.

25. The system of claim 23, further comprising a security system to which the multiple detectors are operatively connected at least partly over the premises power distribution lines to form a communication link for the detector programming signal information.

26. The system of claim 1, in which each of the detectors includes battery back-up apparatus to provide electric power to the detector and thereby maintain its operation in an absence of electric power on the premises power distribution lines.

27. The system of claim 1, in which the hazardous condition detectors include smoke detectors.

28. The system of claim 1, in which the hazardous condition detectors include hazardous gas detectors.

29. The system of claim 1, in which the hazardous condition detectors include at least one smoke detector and at least one hazardous gas detector.

30. The system of claim 1, in which the other ones of the devices respond to a signal that interrupts or terminates the communication of alarm signals.

31. The system of claim 30, in which each detector further comprises, in operative association with its corresponding transceiver, an actuator providing the signal that interrupts or terminates the communication of alarm signals.

32. The system of claim 1, in which the modulated carrier signals conveying information include detector programming signal information.

33. The system of claim 32, further comprising a computer to which each of a number of the one or more detectors is operatively connected at least partly over the premises power distribution lines to form a communication link for the detector programming signal information.

34. The system of claim 32, further comprising a security system to which each of a number of the one or more detectors is operatively connected at least partly over the premises power distribution lines to form a communication link for the detector programming signal information.

35. A life safety system using an electric power line communications system operatively associated with premises power distribution lines of an electric power distribution system to provide through the premises power distribution lines highly reliable communication links among modulated carrier signal receiving devices electrically coupled or located in proximity to the premises power distribution lines to convey hazardous condition alarm signals, comprising:

multiple hazardous condition devices placed at or near different locations where premises power distribution lines are routed to make electric power available, each of the devices having an identification address and the multiple devices including one or more hazardous condition detectors, each detector producing a hazardous condition signal in response to detection of a hazardous condition in the location of the detector, the identification addresses in association with the power distribution lines contributing to establishment of communication links among the devices;

a power line transceiver operatively associated with each detector and designed to transmit and receive over the premises power distribution lines modulated carrier signals conveying information over the communication links, the power line transceiver operating in a transmitter mode as an intentional radiator to emit the modulated carrier signals by transmitting them at a frequency band and a power level sufficient to form by electrical conduction a communication link with a modulated carrier signal receiving device that is electrically coupled to the premises power distribution lines, or to form by at least one of electrical induction a communication link by coupling across electric power distribution line phases or electromagnetic radiation a communication link with a modulated carrier signal receiving device that is located in proximity to the premises power distribution lines; and the transceiver of each detector that produces the hazardous condition signal emitting a modulated carrier alarm signal over the premises power distribution lines for delivery to other ones of the devices by the communication links to enable communication of alarm signals at the premises locations of the devices in response to detection of a hazardous condition.

36. The system of claim 35, in which the modulated carrier signals conveying information include an acknowledgment signal verifying receipt by the power line transceiver of the information conveyed.

37. The system of claim 35, further comprising a controllable light switch device that responds to the emitted hazardous condition signal sent over the power distribution lines by activating for purposes of emergency lighting a lamp that illuminates an occupant evacuation path in response to the detector that produced the hazardous condition signal.

38. The system of claim 35, in which one of the devices comprises a remote annunciator that responds to the hazardous condition signal by producing a warning signal that is perceptible to an occupant in the vicinity of the remote annunciator.

39. The system of claim 38, in which the remote annunciator includes one of a visual device or an audio device.

40. The system of claim 35, in which each of a number of the one or more detectors includes battery back-up apparatus to provide electric power to the detector and thereby maintain its operation in an absence of electric power on the premises power distribution lines.

41. The system of claim 35, in which the one or more hazardous condition detectors include a smoke detector.

42. The system of claim 35, in which the one or more hazardous condition detectors include a hazardous gas detector.

43. The system of claim 35, in which the hazardous condition devices include a telephone dialer, an off/on switch, or both of them.

44. A life safety system using an electric power line communications system operatively associated with premises power distribution lines of an electric power distribution system to provide through the premises power distribution lines highly reliable communication links among modulated carrier signal receiving devices electrically coupled or located in proximity to the premises power distribution lines to convey hazardous condition alarm signals, comprising:

multiple hazardous condition devices placed at or near different locations where premises power distribution lines are routed to make electric power available, each of the devices having an identification address and the multiple devices comprising one or more hazardous condition detectors that include a remote annunciator;

each detector producing a hazardous condition signal in response to detection of a hazardous condition in the location of the detector, the remote annunciator responding to the hazardous condition signal by producing a warning signal that is perceptible to an occupant in the vicinity of the remote annunciator, and the identification addresses in association with the power distribution lines contributing to establishment of communication links among the devices;

a power line transceiver operatively associated with each detector and designed to transmit and receive over the premises power distribution lines modulated carrier signals conveying information over the communication links, the power line transceiver operating in a transmitter mode to emit the modulated carrier signals by transmitting them at a frequency band and a power level sufficient to form by electrical conduction a communication link with a modulated carrier signal receiving device that is electrically coupled to the premises power distribution lines, or to form a communication link with a modulated carrier signal receiving device that is located in proximity or connected to the premises power distribution lines; and the transceiver of each detector that produces the hazardous condition signal emitting a modulated carrier alarm signal over the premises power distribution lines for delivery to other ones of the devices by the communication links to enable communication of alarm signals at the premises locations of the devices in response to detection of a hazardous condition.

45. The system of claim 44, in which the remote annunciator includes one of a visual device or an audio device.

46. The system of claim 44, in which the remote annunciator includes a controllable light switch.

47. The system of claim 44, further comprising a controllable light switch device that responds to the emitted hazardous condition signal sent over the power distribution lines by activating for purposes of emergency lighting a lamp that illuminates an occupant evacuation path in response to the detector that produced the hazardous condition signal.

48. The system of claim 44, in which the other ones of the devices respond to a signal that interrupts or terminates the communication of alarm signals.

49. The system of claim 48, in which each detector further comprises, in operative association with its corresponding transceiver, an actuator providing the signal that interrupts or terminates the communication of alarm signals.

* * * * *